United States Patent [19]

Hase et al.

[11] Patent Number: 4,874,985

[45] Date of Patent: Oct. 17, 1989

[54] PHOSPHOR AND ELECTRON EXCITED FLUORESCENT DISPLAY DEVICE USING THE SAME

[75] Inventors: Takashi Hase, Ebina; Hidemi Yoshida, Odawara, both of Japan

[73] Assignee: Kasei Optonix Limited, Japan

[21] Appl. No.: 224,285

[22] Filed: Jul. 25, 1988

Related U.S. Application Data

[60] Continuation of Ser. No. 925,495, Oct. 29, 1986, abandoned, which is a continuation of Ser. No. 669,430, Nov. 8, 1984, abandoned, which is a division of Ser. No. 467,395, Feb. 17, 1983, abandoned.

[30] Foreign Application Priority Data

| Feb. 19, 1982 [JP] | Japan | 59-25545 |
| Apr. 30, 1982 [JP] | Japan | 59-74006 |
| Apr. 30, 1982 [JP] | Japan | 59-74007 |
| Jun. 7, 1982 [JP] | Japan | 59-97329 |

[51] Int. Cl.⁴ .......................... H01J 1/63; H01J 29/20; C09K 11/54

[52] U.S. Cl. ................ 313/487; 313/467; 252/301.65

[58] Field of Search .............. 313/486, 487, 467, 468; 252/301.4 S, 301.4 P, 301.6 S, 301.6 P, 301.4 H

[56] References Cited

U.S. PATENT DOCUMENTS

| 2,623,859 | 12/1952 | Kroger et al. | 252/301.65 |
| 2,947,704 | 8/1960 | Apple | 252/301.65 |
| 3,595,804 | 7/1971 | Martin | 252/301.65 |
| 3,657,142 | 4/1972 | Poss | 252/301.65 |
| 3,891,886 | 6/1975 | Woontner | 313/467 |

OTHER PUBLICATIONS

Van Gool et al., "Philips Res Repts." pp. 15,254–15,274, Jan. 1960.

Primary Examiner—Kenneth Wieder
Attorney, Agent, or Firm—Gerald J. Ferguson

[57] ABSTRACT

A sulfide phosphor emitting green to orange light with long after-glow is represented by the formula of $(ZN_{1-x},Cd_x)S:eM^I,fM^{III}, gX'$ wherein $M^I$ is at least one of copper and gold, $M^{III}$ is at least one of gallium and indium, $X'$ is at least one of chlorine, bromine, iodine, fluorine and aluminum, and $x$, $e$, $f$ and $g$ satisfy the conditions of $0 \leq x \leq 0.4$, $10^{-8} \leq e \leq 10^{-2}$, $5 \times 10^{-8} \leq f \leq 5 \times 10^{-3}$, and $5 \times 10^{-8} \leq g \leq 5 \times 10^{-3}$. A white emitting phosphor is obtained by mixing the long after-glow yellow emitting phosphor represented by the above formula wherein $0 \leq x \leq 0.3$ and $10^{-6} \leq e \leq 10^{-2}$, with a long after-glow blue emitting phosphor. These sulfide phosphors are used to form fluorescent screens of electron excited fluorescent display devices.

5 Claims, 7 Drawing Sheets

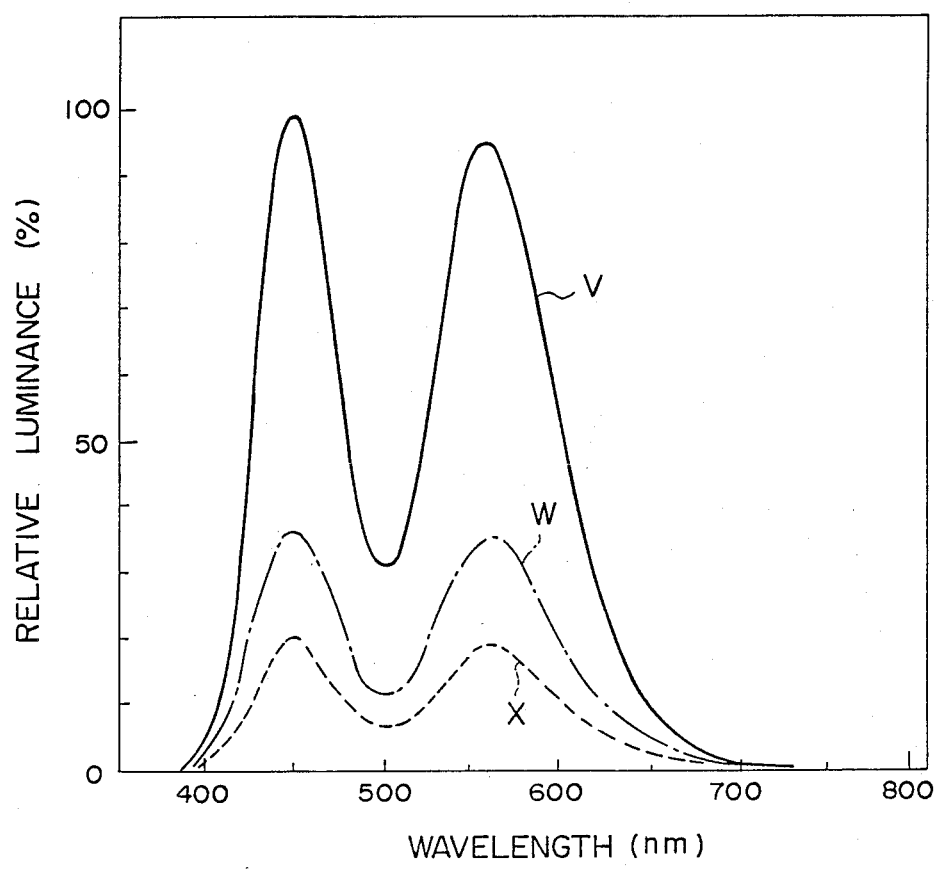

PHOSPHOR AND ELECTRON EXCITED FLUORESCENT DISPLAY DEVICE USING THE SAME

This application is a continuation of Ser. No. 925,495, filed 10/29/86, now abandoned, which is a continuation of application Ser. No. 669,430, filed 11/8/84, now abandoned, which itself was a divisional application of application Ser. No. 467,395, filed 2/17/83, now abandoned.

BACKGROUND OF THE INVENTION

1. Field of the Invention

This invention relates to a sulfide phosphor which emits green to orange light with long after-glow when excited with an electron beam, a long after-glow white emitting phosphor containing the yellow emitting sulfide phosphor as a yellow emitting constituent, and an electron excited fluorescent display device using the green to orange emitting phosphor or the white emitting phosphor.

2. Description of the Prior Art

Recently, electron excited fluorescent display devices such as cathode ray tube (CRT) and low-velocity electron excited fluorescent display device (The term "electron excited fluorescent display devices" referred to in this specification should be interpreted as CRT's or low-velocity electron excited fluorescent display devices.) are used for various purposes, and there is desired a phosphor exhibiting good after-glow after supply of excitation energy thereto is stopped. For example, in terminal display units of a computer system for displaying fine characters and figures, display units of an aircraft control system, and the like, it is desired to use a CRT exhibiting high resolution. As an effective method of improving the resolution of the CRT, it is known to reduce the frame frequency of the CRT. Namely, by reducing the frame frequency of approximately 55 Hz in ordinary CRTs such as television CRTs to approximately 30 Hz, it is possible to expand the signal frequency band by approximately two times that of ordinary CRTs or to set the image frequency to approximately half of the image frequency of ordinary CRTs, thereby to increase the resolution. The reason why the resolution can be increased by reducing the frame frequency of the CRT is that the image frequency band of a CRT drive circuit is determined by the product of the frame frequency and the signal frequency band.

The fluorescent screen of the high resolution CRT as described above should be constituted by a phosphor exhibiting long after-glow. This is because, if the fluorescent screen of the CRT is constituted by a short after-glow phosphor, the image displayed on the fluorescent screen flickers undesirably due to a low scanning speed on the fluorescent screen. In general, it is necessary for the phosphor constituting the fluorescent screen of the high resolution CRT to exhibit an after-glow period several tens of times to several hundreds of times longer than the after-glow period of the short after-glow phosphor which constitutes the fluorescent screen of the ordinary CRTs. The term "after-glow period" as used herein means the time required for the emission luminance to decrease to 10% of the emission luminance under excitation after the excitation of the phosphor is stopped, i.e. the 10% luminance after-glow period.

As the long after-glow phosphors usable in the high resolution CRT, there have heretofore been known a manganese and arsenic activated zinc silicate green emitting phosphor ($Zn_2SiO_4$:Mn,As), a manganese activated potassium magnesium fluoride orange emitting phosphor ($KMgF_3$:Mn), a lead and manganese activated calcium silicate orange emitting phosphor ($CaSiO_3$:Pb,Mn), a manganese activated magnesium fluoride red emitting phosphor ($MgF_2$:Mn), a manganese activated zinc magnesium orthophosphate red emitting phosphor [$(Zn,Mg)_3(PO_4)_2$:Mn], and the like. However, these known phosphors exhibit only limited emission color and after-glow period characteristics intrinsic to the respective phosphors, and the coating characteristics thereof are not satisfactory. On the other hand, as a wide variety of high resolution CRTs are recently required, a need exists for various long after-glow phosphors exhibiting various emission color tones, emission of high luminance, and a wide range of after-glow periods as desired. Particularly, since a phosphor emitting yellow light with long after-glow is necessary to black-and-white display CRTs, there has been a strong desire to develop such a phosphor. Further, a long after-glow green emitting phosphor and a long after-glow orange emitting phosphor are necessary for use in monochrome display devices.

However, there has not been known any single phosphor emitting white light with long after-glow. Further, since a long after-glow blue emitting phosphor and a long after-glow yellow emitting phosphor have not heretofore been known, a long after-glow white emitting phosphor obtained by mixing them does not exist. Another approach to obtaining white emission is to mix three phosphors as the red emitting component, the green emitting component and the blue emitting component. However, a long after-glow blue emitting phosphor has not been known and, in addition, since the long after-glow red emitting phosphor and the long after-glow green emitting phosphor exhibit after-glow characteristics curves different from each other, color drift occurs in the after-glow. Further, color shading readily occurs when many phosphors exhibiting emission colors different from one another are mixed. For these reasons, it is not desirable to obtain the long after-glow white emitting phosphor by mixing the three color component phosphors exhibiting emission colors different from one another.

As described above, there has not heretofore been known any phosphor emitting white light with long after-glow, and consequently there exists no black-and-white television CRT for display that is provided with a fluorescent screen comprising the phosphor emitting white light with long after-glow and which can display an image at high resolution.

On the other hand, since the visual sensitivity of the eye of human is higher to light having a wavelength within the green region, green light can be felt as being highly luminous compared with the other emission colors even when the emission energy is the same, and does not cause the eye to be much fatigued even when the viewing time is long. Therefore, a display CRT (hereinafter simply referred to as "CRT") emitting green light and exhibiting high resolution is widely used.

As the long after-glow green emitting phosphor to be used in such a CRT, a manganese and arsenic activated zinc silicate phosphor (P39 phosphor) or the like has heretofore been known. The P39 phosphor is the sole phosphor available at present as the long after-glow green emitting phosphor put into practice from the viewpoints of both emission luminance and the after-glow period, and is used in large amounts. However, since the P39 phosphor contains arsenic, it presents a very real problem with regard to pollution. Accordingly, a need exists for a CRT using a long after-glow green emitting phosphor containing no pollutant. Further, the P39 phosphor obtained according to the preparation method heretofore used is in the form of finely-divided grains having an average grain size (single grain size) within the range of $2\mu$ to $3\mu$. Even larger grains obtained by the preparation method have a grain size of $5\mu$ or less, and the grain size distribution achieved by the method is wide. On the other hand, from the viewpoints of coating characteristics, emission efficiency and the like, phosphor grains having a median of grain size within the range of about $6\mu$ to $12\mu$ and exhibiting narrow grain size distribution are generally used as the phosphor coated on the fluorescent screen. Because of the above and also because of the crystal shape, the coating characteristics of the P39 phosphor are not good. The P39 phosphor is disadvantageous also in that the yield of the phosphor product markedly drops when the phosphor grains are classified to obtain grains of uniform grain size, and the phosphor coat formed on the fluorescent screen becomes uneven due to difference in grain size when the phosphor is mixed with another phosphor.

A CRT emitting orange light and exhibiting high resolution is also used widely since it does not cause the eye to be much fatigued even when viewed for a long period.

As the long after-glow orange emitting phosphor to be practically used in such a CRT, a phosphor mixture of the P39 phosphor with a manganese activated zinc phosphate (P27 phosphor) emitting red light has heretofore been used. However, since the phosphor used is a mixture of two phosphors exhibiting emission colors different from each other, it develops color shading when resolution is set high and is not suitable for practical use. Further, the luminance of emission of this phosphor mixture is insufficient. On the other hand, as a single phosphor emitting orange light with longer afterglow, a lead and manganese activated calcium silicate phosphor (P25 phosphor) is known. However, the luminance of emission of the P25 phosphor is too low to be suitable for practical use, and the emission color thereof scarcely changes with the amount of activator contained therein, or the like. Thus, the P25 phosphor cannot exhibit various emission colors and is not suitable for use in CRTs.

Further, as a CRT adapted to a wide variety of applications is recently demanded, it has been desired to develop a CRT provided with a fluorescent screen comprising a long after-glow orange emitting phosphor the emission color tone of which can be freely selected from the range between orange near to red and orange near to yellow, and which exibits emission of high luminance. On the other hand, the fluorescent screen of a high resolution CRT is required to exhibit markedly high uniformity from the viewpoint of the CRT functions compared with the fluorescent screen of the conventional color television CRT or the like. However, the grain shape and the grain size distribution of the aforesaid P25 phosphor, P27 phosphor and P39 phosphor are not suitable for forming a uniform fluorescent screen. Therefore, these phosphors make the yield in production of CRTs using them very low, and are very disadvantageous from the industrial viewpoint.

SUMMARY OF THE INVENTION

An object of the present invention is to provide a phosphor which emits green to orange light with long after-glow, and an electron excited fluorescent display device comprising the phosphor in the fluorescent screen.

Another object of the present invention is to provide a phosphor which emits white light with long after-glow and which exhibits good emission characteristics, and an electron excited fluorescent display device comprising the phosphor in the fluorescent screen.

A further object of the present invention is to provide an electron excited fluorescent display device which emits green light and which is provided with a fluorescent screen containing no pollutant.

A still further object of the present invention is to provide an electron excited fluorescent display device which emits green light of higher luminance than the conventional device of this type.

Another important object of the present invention is to provide an electron excited fluorescent display device provided with a fluorescent screen comprising a long after-glow orange emitting phosphor the emission color of which can be freely selected from the range between orange near to red and orange near to yellow.

An additional object of the present invention is to provide an electron excited fluorescent display device provided with a long after-glow orange emitting phosphor exhibiting emission of high luminance.

An even further object of the present invention is to provide an electron excited fluorescent display device which emits orange light and which is provided with a uniform fluorescent screen capable of being produced at a high yield.

The inventors of the present invention conducted various investigations to accomplish the above objects. As a result, it was found that a sulfide phosphor comprising a combination of a specific activator and a specific coactivator exhibits long after-glow characteristics and allows free selection of emission color from a wide range of green to orange, and the first aspect of the present invention was completed.

It was also found that, in the long after-glow phosphor according to the first aspect of the present invention, the coactivator contained in the phosphor affects the luminance of emission of the phosphor, and the luminance of emission of the phosphor is decreased as the amount of coactivator contained in the phosphor is increased. Therefore, the inventors conducted further investigations to increase the luminance of emission of the phosphor according to the first aspect of the present invention. As a result of these investigations, it was found that the decrease in the luminance of emission of the phosphor due to activation thereof with the coactivator can be considerably prevented without greatly affecting the after-glow characteristics when crude zinc sulfide or zinc cadmium sulfide powder added with a large amount of sulfur during the preparation thereof is used as the raw material of the matrix so that a trace amount of sulfur is contained in the phosphor obtained. Based on this finding, the second aspect of the present invention was completed. Further, the electron excited fluorescent display device in accordance with the present invention was completed by using the phosphor in accordance with the present invention as the green to orange emitting component of the fluorescent screen.

The sulfide phosphor emitting green to orange light with long after-glow in accordance with the first aspect of the present invention is represented by the formula:

$$(Zn_{1-x},Cd_x)S:eM^I,fM^{III},gX'$$

wherein $M^I$ is at least one of copper and gold, $M^{III}$ is at least one of gallium and indium, $X'$ is at least one of chlorine, bromine, iodine, fluorine and aluminium, and x, e, f and g are numbers respectively satisfying the conditions of $0 \leq x \leq 0.4$, $10^{-8} \leq e \leq 10^{-2}$, $5 \times 10^{-8} \leq f \leq 5 \times 10^{-3}$, and $5 \times 10^{-8} \leq g \leq 5 \times 10^{-3}$.

The sulfide phosphor emitting green to orange light with long after-glow in accordance with the second aspect of the present invention is characterized by containing sulfur in an amount within the range of $10^{-7}$ g to $8 \times 10^{-3}$ g per gram of the matrix in the sulfide phosphor in accordance with the first aspect of the present invention.

The electron excited fluorescent display device in accordance with the present invention comprises, as a green to orange emitting component of a fluorescent screen, a sulfide phosphor which emits green to orange light with long after-glow and which is represented by the formula:

$$(Zn_{1-x},Cd_x)S:eM^I,fM^{III},gX'$$

wherein $M^I$ is at least one of copper and gold, $M^{III}$ is at least one of gallium and indium, $X'$ is at least one of chlorine, bromine, iodine, fluorine and aluminium, and x, e, f and g are numbers respectively satisfying the conditions of $0 \leq x \leq 0.4$, $10^{-8} \leq e \leq 10^{-2}$, $5 \times 10^{-8} \leq f \leq 5 \times 10^{-3}$, and $5 \times 10^{-8} \leq g \leq 5 \times 10^{-3}$.

The sulfide phosphors in accordance with the present invention can exhibit any emission color within the range of green to orange by selection of the Cd amount (value x) in the matrix of the phosphor, and the kind ($M^I$) and the amount (value e) of the activator. Further, the sulfide phosphors can selectively show various after-glow periods within the range of several milliseconds to several hundreds of milliseconds by the adjustment of the amounts (values f and g) of the first coactivator ($M^{III}$) and the second coactivator ($X'$). Unlike the conventional long after-glow phosphors, the sulfide phosphors in accordance with the present invention exhibit good coating characteristics and can form a satisfactory fluorescent screen.

The after-glow period of the sulfide phosphors in accordance with the present invention after the excitation thereof with an electron beam, ultraviolet rays, or the like is stopped is several tens of times to several hundreds of times longer than the after-glow period of the conventional sulfide phosphors in which at least one of gold and copper is employed as the activator, the aforesaid second coactivator is employed as the coactivator, and the matrix is the same as in the present invention. The phosphors in accordance with the present invention comprise the cubic or hexagonal crystal system as the main crystalline phase thereof, depending on the composition and the temperature of firing conducted in the preparation of the phosphors. However, the phosphor comprising the cubic crystal system as the main crystalline phase thereof exhibits higher luminance of emission than the luminance of emission of the phosphor comprising the hexagonal crystal system as the main crystalline phase thereof. Further, when the amount of the aforesaid first coactivator (Ga and/or In) contained in the phosphors is within the range imparting higher luminance of emission and higher purity of emission color to the phosphors. The phosphor comprising the cubic crystal system as the main crystalline phase thereof exhibits a longer after-glow period than the after-glow period of the phosphor comprising the hexagonal crystal system as the main crystalline phase thereof. For these reasons, of the phosphors according to the present invention, the phosphor comprising the cubic crystal system as the main crystalline phase thereof is more preferable as the phosphor for high resolution CRTs than the phosphor comprising the hexagonal crystal system as the main crystalline phase thereof.

The inventors conducted further investigations to provide such a longer after-glow white emitting phosphor that emission of white light can be achieved by use of a few emission component phosphors, and the respective emission component phosphors exhibit sufficient after-glow and approximately equal after-glow characteristics, and to provide an electron excited fluorescent display device comprising the phosphor in the fluorescent screen. As a result of these investigations, the inventors discovered a novel phosphor emitting blue light with long after-glow and a novel phosphor emitting yellow light with long after-glow. The investigations also revealed that it is possible to provide a long after-glow white emitting phosphor comprising a mixture of two component phosphors, i.e. the phosphor emitting blue light with long after-glow and the phosphor emitting yellow light with long after-glow, and to provide a black-and-white electron excited fluorescent display device comprising the white emitting phosphor in the fluorescent screen.

The white emitting phosphor in accordance with the present invention essentially consists of a mixture of (1) a phosphor which emits blue light with long after-glow and which is represented by the formula:

$$ZnS:aAg:bM^I:cM^{III}:dx$$

wherein $M^I$ is at least one of copper and gold, $M^{III}$ is at least one of gallium and indium, X is at least one of chlorine, bromine, iodine, fluorine and aluminium, and a, b, c and d are numbers respectively satisfying the conditions of $5 \times 10^{-6} \leq a \leq 10^{-3}$, $0 \leq b \leq 2 \times 10^{-4}$, $10^{-8} \leq c \leq 10^{-3}$, and $5 \times 10^{-8} \leq d \leq 5 \times 10^{-4}$, (2) a phosphor which emits yellow light with long after-glow and which is represented by the formula:

$$(Zn_{1-x},Cd_x)S:eM^I,fM^{III},gX'$$

wherein $M^I$ is at least one of copper and gold, $M^{III}$ is at least one of gallium and indium, $X'$ is at least one of chlorine, bromine, iodine, fluorine and aluminium, and x, e, f and g are numbers respectively satisfying the conditions of $0 \leq x \leq 0.3$, $10^{-6} \leq e \leq 10^{-2}$, $5 \times 10^{-8} \leq f \leq 5 \times 10^{-3}$, and $5 \times 10^{-8} \leq g \leq 5 \times 10^{-3}$, the weight ratio of the phosphor emitting yellow light with long after-glow to the phosphor emitting blue light with long after-glow being within the range of 0.34 to 5.00. Strictly speaking, the long after-glow yellow emitting phosphor defined above emits yellow-green to yellow light. However, this phosphor is herein simply referred to as emitting yellow light.

The present invention also provides an electron excited fluorescent display device provided with a fluorescent screen comprising, as a white emitting component, a white emitting phosphor essentially consisting of a mixture of (1) a phosphor which emits blue light with long after-glow and which is represented by the formula:

$$ZnS:aAg,bM^I,cM^{III},dX$$

wherein $M^I$, $M^{III}$, X, a, b, c and d are as defined above, and (2) a phosphor which emits yellow light with long after-glow and which is represented by the formula:

$$(Zn_{1-x},Cd_x)S:eM^{I'},fM^{III'},gX'$$

wherein $M^{I'}$, $M^{III'}$, X', x, e, f and g are as defined above, the weight ratio of the phosphor emitting yellow light with long after-glow to the phosphor emitting blue light with long after-glow being within the range of 0.34 to 5.00.

The values a to f in the formulas described above represent the amounts of the activators and coactivators expressed in terms of gram per gram of the matrix of the phosphor to be activated by the activators and coactivators.

The white emitting phosphor in accordance with the present invention can exhibit arbitrary white emission according to the mixing ratio of the long after-glow yellow emitting phosphor to the long after-glow blue emitting phosphor. Further, since the after-glow characteristics of the long after-glow blue emitting phosphor can be made approximately equal to the after-glow characteristics of the long after-glow yellow emitting phosphor, the white emitting phosphor exhibits white emission free of color drift.

Further, in the electron excited fluorescent display device of the present invention just described above, since the difference in the grain size distribution between the long after-glow blue and yellow emitting phosphors can substantially be eliminated, it is possible to form a uniform fluorescent screen free of color shading. Furthermore, since the after-glow period can be freely adjusted, it is possible to employ any necessary frame frequency.

The long after-glow blue emitting phosphor and the long after-glow yellow emitting phosphor employed in the present invention comprise the cubic or hexagonal crystal system as the main crystalline phase thereof, depending on the composition and the temperature of firing conducted in the preparation of the phosphors. However, the phosphors comprising the cubic crystal system as the main crystalline phase thereof exhibit higher luminance of emission than the luminance of emission of the phosphors comprising the hexagonal crystal system as the main crystalline phase thereof. Further, when the amount of the aforesaid first coactivator (Ga and/or In) contained in the phosphors is within the range imparting higher luminance of emission and higher purity of emission color to the phosphors the phosphors comprising the cubic crystal system as the main crystalline phase thereof exhibit a longer after-glow period than the after-glow period of the phosphors comprising the hexagonal crystal system as the main crystalline phase thereof. For these reasons, of the phosphors according to the present invention, the phosphors comprising the cubic crystal system as the main crystalline phase thereof are more preferable as the phosphors for CRTs than the phosphors comprising the hexagonal crystal system as the main crystalline phase thereof. However, in the case of the long after-glow yellow emitting phosphor containing cadmium (Cd) in the matric thereof, the main crystalline phase of the phosphor generally becomes the hexagonal crystal system when the content of Cd increases up to approximately 5 mol % or more.

The values of the after-glow period referred to in this invention is the values when the current density of the excitation electron beam is 0.4 $\mu A/cm^2$. In this connection, it should be noted that the phosphors employed in the present invention exhibit unique characteristics which the conventional long after-glow phosphors do not show. Namely, the after-glow period of the phosphors employed in the present invention greatly changes according to the current density of the excitation electron beam, and becomes longer when the current density is decreased.

The phosphors in accordance with the present invention can be prepared as described below.

As raw materials for the phosphor, the following are used:

(i) crude zinc sulfide or zinc cadmium sulfide powder (as the raw material for the matrix), or crude zinc sulfide or zinc cadmium sulfide powder added with a large amount of sulfur during preparation thereof (as the raw material for the matrix and sulfur), (ii) at least one compound selected from the group consisting of compounds of gold and copper, such as nitrate, sulfide, or halide (as the raw material for the activator), (iii) at least one compound selected from the group consisting of compounds of gallium and indium, such as nitrate, sulfide, or halide (as the raw material for the first coactivator), and (iv) at least one compound selected from the group consisting of chlorides, bromides, iodides, and fluorides of alkali metals (Na, K, Li, Rb and Cs) and alkaline earth metals (Ca, Mg, Sr, Zn, Cd and Ba), and an aluminium compound such as aluminium nitrate, aluminium sulfate, aluminium oxide, or an aluminium halide (as the raw material of the second coactivator). The raw material (i) for the matrix and sulfur can be prepared, for example, by adding ammonium sulfide to a weakly acidic aqueous zinc sulfate or zinc cadmium sulfide solution having a pH value within the range of 6 to 4 while the pH value thereof is maintained constant, thereby precipitating zinc sulfide or zinc cadmium sulfide. The amount of surplus sulfur contained beyond the stoichiometric amount in the crude zinc sulfide or zinc cadmium sulfide powder thus prepared depends on the pH value of the aqueous solution during the formation of the precipitates, and increases as the pH value is decreased (i.e. as the acidity of the aqueous solution is increased). In general, the crude powder precipitated from the aqueous solution having a pH value within the range of 6 to 4 contains surplus sulfur in an amount exceeding the stoichiometric amount by several tens of wt. % to several-tenths wt. % based on zinc sulfide or zinc cadmium sulfide. The major portion of surplus phosphor contained beyond the stoichiometric amount of sulfur in the crude powder is lost during the firing process, and only a very small portion of the surplus sulfur remains in the phosphor obtained after firing. Therefore, as the raw material (i), the crude powder containing sulfur in such an amount that the amount of the surplus sulfur finally remaining beyond the stoichiometric amount of sulfur in the phosphor is within the range of $10^{-7}$ to $8 \times 10^{-3}$ g/g based on the matrix.

The raw material (i) for the matrix, the raw material (ii) for the activator, the raw material (iii) for the first coactivator, and the raw material (iv) for the second coactivator are used in such a weight ratio that the amount (value e) of at least one of gold and copper in the raw material (ii) for the activator, and the amount (value f) of at least one of Ga and In in the raw material (iii) for the first coactivator, respectively, are within the range of $10^{-6}$ to $10^{-2}$ g/g based on the raw material (i) for the matrix, and within the range of $5 \times 10^{-8}$ to $5 \times 10^{-3}$ g/g based on the raw material (i) for the matrix. The raw material (iv) for the second coactivator is used in such an amount that the amount of at least one chlorine, bromine, iodine, fluorine and aluminium (i.e. the amount of the second coactivator) contained in the phosphor obtained is within the range of $5 \times 10^{-8}$ to $5 \times 10^{-3}$ g/g based on the matrix. Namely, as in the case of the activator and the first coactivator, all portion of aluminium contained in the raw material for the second coactivator remains in the phosphor obtained and serves as the second coactivator. However, in the case of a halogen, the major portion of the halogen contaned in the raw material for the second coactivator is lost during the firing process, and only a very small portion thereof remains in the phosphor obtained after firing. In this case, therefore, the halide of an alkali metal or an alkaline earth metal employed as the raw material for the halogen is used in such an amount that the halide contains the halogen in an amount within the range of several tens of times to several hundreds of times larger than the halogen coactivator amount to be finally contained in the phosphor, depending on the firing temperature of the like. When a halide is employed as the raw material for the activator, when a halide is employed as the raw material for the first coactivator, or when an aluminium halide is employed as the raw material for aluminium, a part of the necessary amount of the halogen is donated by these raw materials. The halide of an alkali metal or an alkaline earth metal serves both as a halogen donor and as a flux.

Necessary amounts of the aforesaid four raw materials for the phosphor are weighed, and intimately mixed in a pulverizing mixer such as ball mill or mixer mill to obtain a raw material mixture. Mixing of the raw materials for the phosphor may be conducted in wet condition by adding solution of the raw material (ii) for the activator, the raw material (iii) for the first coactivator and the raw material (iv) for the second coactivator to the raw material (i) for the matrix. In this case, the raw material mixture obtained is then dried sufficiently.

Thereafter, the raw material mixture thus obtained is charged into a heat-resistant vessel such as quartz crucible or quartz tube, and fired. The firing is carried out in an sulfiding atmosphere containing, for example, hydrogen sulfide, sulfur vapor, carbon disulfide or the like. The firing temperature is preferably within the range of 600° to 1,200° C. In the case wherein the phosphor in accordance with the present invention contains zinc sulfide as the matrix, the phosphor obtained by the firing manifests the hexagonal crystal system as the main crystalline phase thereof when the firing temperature is higher than 1,050° C. When the firing temperature is 1,050° C. or lower, the obtained phosphor manifests the cubic crystal system as the main crystalline phase thereof. Namely, the phosphor containing zinc sulfide as the matrix has the phase transition point in the vicinity of 1,050° C. In the case wherein the phosphor in accordance with the present invention contains zinc cadmium sulfide as the matrix, the phase transition point of the phosphor changes according to the content of cadmium and the firing temperature. In general, there is a tendency for the phosphor to manifests the hexagonal crystal system as the main crystal phoase as the content of cadmium is increased, and the phosphor having the matrix in which 10 mol % or more of zinc is replaced with cadmium ($x \geq 0.1$) predominantly manifests the hexagonal crystal system. As will be explained later, in the phosphors in which both cubic and hexagonal crystal systems exist and which exhibit approximately the same emission color, the phosphor comprising the cubic crystal system as the main crystalline phase thereof is more preferable as the green to orange emitting phosphor for high resolution CRTs than the phosphor comprising the hexagonal crystal system as the main crystalline phase thereof. Accordingly, the firing temperature should preferably be within the range of 600° to 1,050° C., more preferably within the range of 800° to 1,050° C. The firing period varies according to the firing temperature, the amount of the raw material mixture charged into the fire-resistant vessel, and the like. However, when the firing temperature is within the aforesaid range, the the firing period is preferably within the range of 0.5 to 7 hours. After the firing, the firing product obtained is washed with water, dried and sifted to obtain the phosphor in accordance with the present invention.

The phosphor obtained by the preparation method as described above is the phosphor according to the first aspect of the present invention comprising the sulfide as the matrix, at least one of gold and copper as the activator, at least one of Ga and In as the first coactivator, and at least one of chlorine, bromine, iodine, fluorine and aluminium as the second coactivator, the amounts of the activator, the first coactivator and the second coactivator respectively being within the range of $10^{-6}$ to $10^{-2}$ g/g, within the range of $5 \times 10^{-8}$ to $5 \times 10^{-3}$ g/g, and within the range of $5 \times 10^{-8}$ to $5 \times 10^{-3}$ g/g based on the matrix, or the phosphor according to the second aspect of the present invention containing surplus sulfur in an amount within the range of $10^{-7}$ to $8 \times 10^{-3}$ g per gram of the sulfide phosphor in the phosphor according to the first aspect of the present invention. Like the conventional sulfide and zinc cadmium sulfide phosphors comprising at least one of gold and copper as the activator and X as the coactivator, the phosphor according to the first aspect of the present invention exhibits blue emission of high luminance under excitation with electron beams, ultraviolet rays or the like. However, the 10% luminance after-glow period after the stop of excitation of the phosphor according to the first aspect of the present invention is several tens of times to several hundreds of times longer than the after-glow period of the aforesaid conventional phosphors, depending on the amount of the first coactivator contained in the phosphor. Thus, the phosphor according to the first aspect of the present invention exhibits long after-glow, and the after-glow characteristics thereof changes according to the amount of the first coactivator contained in the phosphor, which also affects the luminance of emission and the emission color. Namely, in the phosphor according to the first aspect of the present invention, the luminance of emission and the purity of the emission color decrease as the amount of the first coactivator contained in the phosphor is increased. On the other hand, the phosphor according to the second aspect of the present invention containing the aforesaid specific amount of surplus sulfur exhibits a luminance of emission approximately several percent to 10% higher than the luminance of emission of the phosphor according to the first aspect of the present invention containing no surplus sulfur exceeding the stoichiometric amount. (As for the other characteristics, i.e. the emission color and the after-glow period, there is no significant difference between both phosphors.)

As described above, the phosphors in accordance with the present invention have a phase transition point varying according to the firing temperature and the Cd content, and manifest the cubic or hexagonal crystal system as the main crystal phase thereof. When the phosphor manifesting the cubic crystal system as the main crystal phase is compared with the phosphor manifesting the hexagonal crystal system as the main crystalline phase, the former exhibits a luminance of emission approximately 1.3 to 2 times higher than the luminace of emission of the latter. Further, when the amount of the first coactivator contained in the phosphor is relatively low, resulting in a higher luminace of emission and higher purity of emission color, the former phosphor exhibits an after-glow period longer than the after-glow period of the latter phosphor. In view of the above, the phosphor manifesting the cubic crystal system as the main crystalline phase thereof is more preferable as the phosphor for high resolution CRTs than the phosphor manifesting the hexagonal crystal system as the main crystal line phase thereof. The emission spectrum of the phosphor manifesting the cubic crystal system as the main crystalline phase thereof is on the slightly longer wavelength side than the emission spectrum of the phosphor manifesting the hexagonal crystal system as the main crystalline phase thereof.

By way of example, the relationshiop between the compositions and emission colors of the phosphors in accordance with the present invention will now be briefly described below.

The phosphor comprising ZnS as the matrix and copper as the activator and further activated with the first and second coactivators has a cubic or hexagonal crystal structure, and exhibits green emission. The phosphor comprising $(Zn_{1-x},Cd_x)S$ wherein $0 \leq x \leq 0.15$ as the matrix and gold as the activator and further activated with the first and second coactivators, and the phosphor comprising $(Zn_{1-x},Cd_x)S$ wherein $0.07 \leq x \leq 0.20$ as the matrix and copper as the activator and further activated with the first and second coactivators have a cubic or hexagonal crystal structure and exhibit yellow emission. The phosphor comprising $(Zn_{1-x}, Cd_x)S$ wherein $0.15 \leq x \leq 0.35$ as the matrix and gold as the activator and further activated with the first and second coactivators, and the phosphor comprising $(Zn_{1-x}, Cd_x)S$ wherein $0.20 \leq x \leq 0.35$ as the matrix and copper as the activator and further activated with the first and second coactivators have a hexagonal crystal structure and exhibit orange emission.

The prsent invention will hereinbelow be described in further detail with reference to the accompanying drawings.

BRIEF DESCRIPTION OF THE DRAWINGS

FIG. 8 is a graph showing the emission spectra of the phosphors in accordance with the present invention and the after-glow emission spectra thereof.

DETAILED DESCRIPTION OF THE INVENTION

Figure 1:
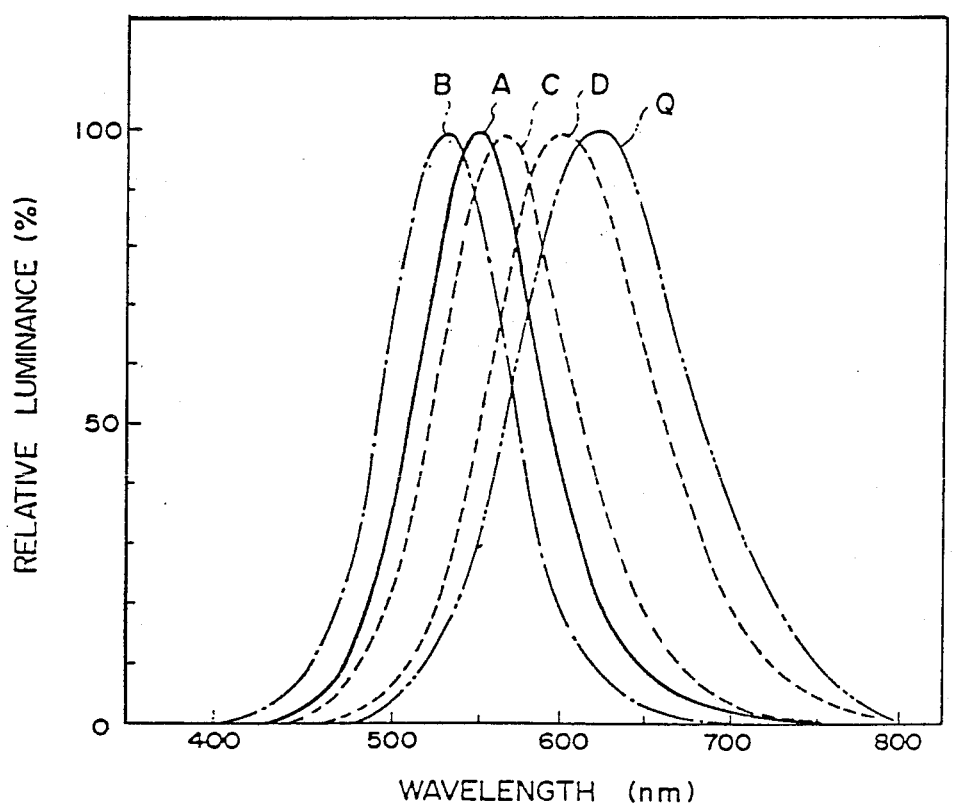
FIG. 1 is a graph showing the emission spectram of the phosphors in accordance with the present invention containing gold as the activator.
Figure 2:
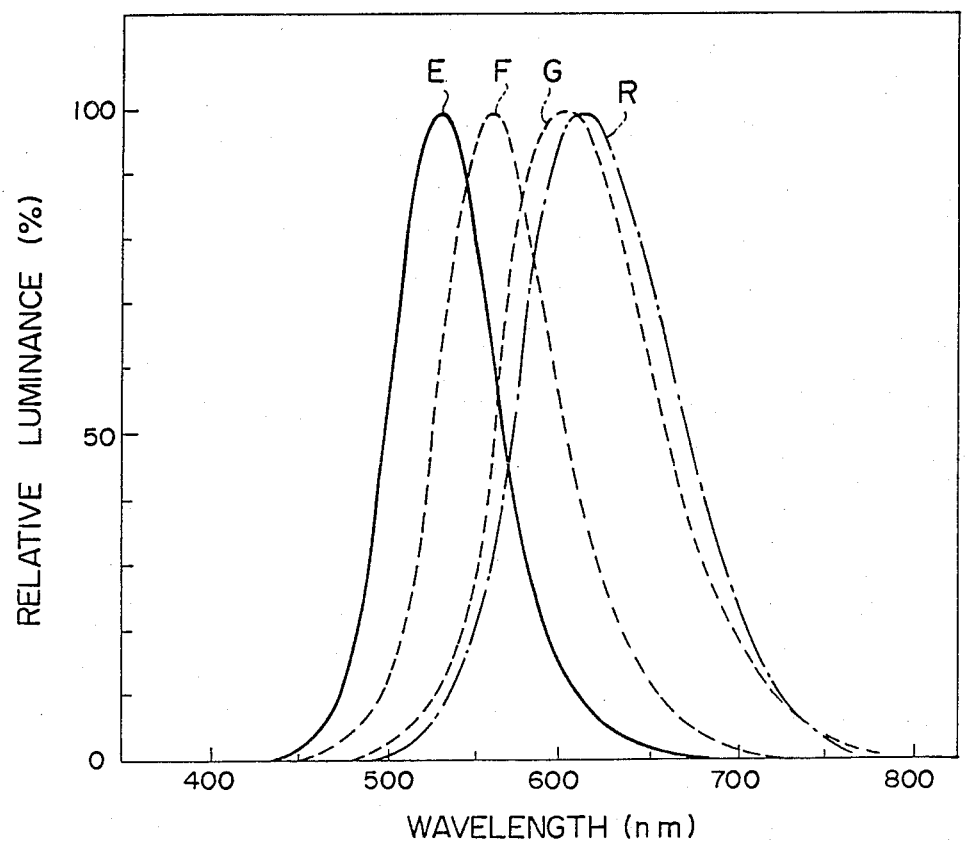
FIG. 2 is a graph showing the emission spectrum of the phosphors in accordance with the present invention containing copper as the activator.

FIGS. 1 and 2 shows the emission spectra of the phosphors in accordance with the present invention. In FIG. 1 showing the emission spectra of the phosphors in accordance with the present invention containing gold as the activator, the curve A shows the emission spectrum of a cubic crystal system phosphor emitting yellow-green light and represented by the formula of ZnS:Au,Ga,Al (wherein the amount of Au is $1.4 \times 10^{-3}$ g/g, the amount of Ga is $6 \times 10^{-5}$ g/g, and the amount of Al is $6 \times 10^{-4}$ g/g; this also applies to the three phosphors described below). The curve B shows the emission spectrum of a hexagonal crystal system phosphor emitting green light and having the same composition as the phosphor of the curve A. The curve C shows the emission spectrum of a hexagonal crystal system phosphor emitting yellow light and represented by the formula of $(Zn_{0.93},Cd_{0.07})S$:Au,Ga,Al. The curve D shows the emission spectrum of a hexagonal crystal system phosphor emitting orange light and represented by the formula of $(Zn_{0.85},Cd_{0.15})S$:Au,Ga,Al.

In FIG. 2 showing the emission spectra of the phosphors in accordance with the present invention containing copper as the activator, the curve E shows the emission spectrum of a cubic crystal system phosphor emitting green light and represented by the formula of ZnS:Cu,Ga,Al (wherein the amount of Cu is $1.2 \times 10^{-4}$ g/g, the amount of Ga is $1.5 \times 10^{-5}$, and the amount of Al is $1.5 \times 10^{-5}$ g/g; this also applies to the two phosphors described below). The curve F shows the emission spectrum of a hexagonal crystal system phosphor emitting yellow light and represented by the formula of $(Zn_{0.89},Cd_{0.11})S$:Cu,Ga,Al. The curve G shows the emission spectrum of a hexagonal crystal system phosphor emitting orange light and represented by the formula of $(Zn_{0.78},Cd_{0.22})S$:Cu,Ga,Al.

As shown in FIGS. 1 and 2, the emission color of the phosphors in accordance with the present invention can be changed within the range of green to orange according to the kind of the activator, the amount of the activator contained in the phosphors, and the crystal structure of the phosphors.

Figure 3:
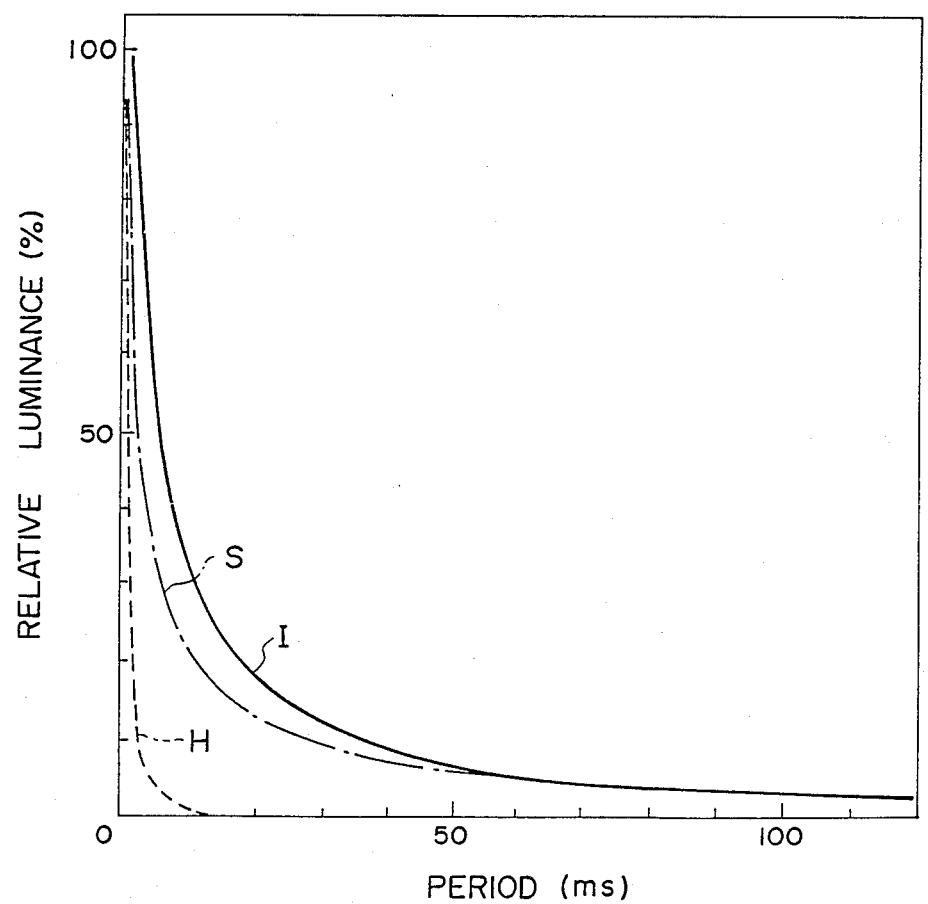
FIG. 3 is a graph showing the after-glow characteristics of the phosphors in accordance with the present invention in comparison with the after-glow characteristics of the conventional ZnS:Au,X phosphor.

FIG. 3 shows the after-glow characteristics of the phosphors in accordance with the present invention in comparison with the after-glow characteristics of the conventional ZnS:Au,X phosphor. In FIG. 3, the curve H shows the after-glow characteristics after the stop of electron excitation of the conventional ZnS:Au,Al phosphor which manifests the cubic crystal system as the main crystalline phase thereof and in which the amounts of gold and aluminium respectively are $1.4\times10^{-3}$ g/g and $6\times10^{-4}$ g/g based on the zinc sulfide matrix. The curve I shows the after-glow characteristics after the stop of electron excitation of a ZnS:Au,Ga,Al phosphor in accordance with the present invention which manifests the cubic crystal system as the main crystalline phase thereof and in which the amounts of gold and aluminium are the same as in the phosphor of the curve I, and the amount of gallium is $2\times10^{-5}$ g/g based on the zinc sulfide matrix.

As is clear from FIG. 3, the ZnS:Au,Ga,Al phosphor in accordance with the present invention exhibits markedly longer after-glow compared with the conventional ZnS:Au,Al phosphor. The after-glow period of the conventional ZnS:Au,Al phosphor is approximately 250 microseconds, while the after-glow period of the ZnS:Au,Ga,Al phosphor in accordance with the present invention is approximately 40 milliseconds, and thus is 160 times or more longer than the after-glow period of the conventional ZnS:Au,Al phosphor.

Figure 4:
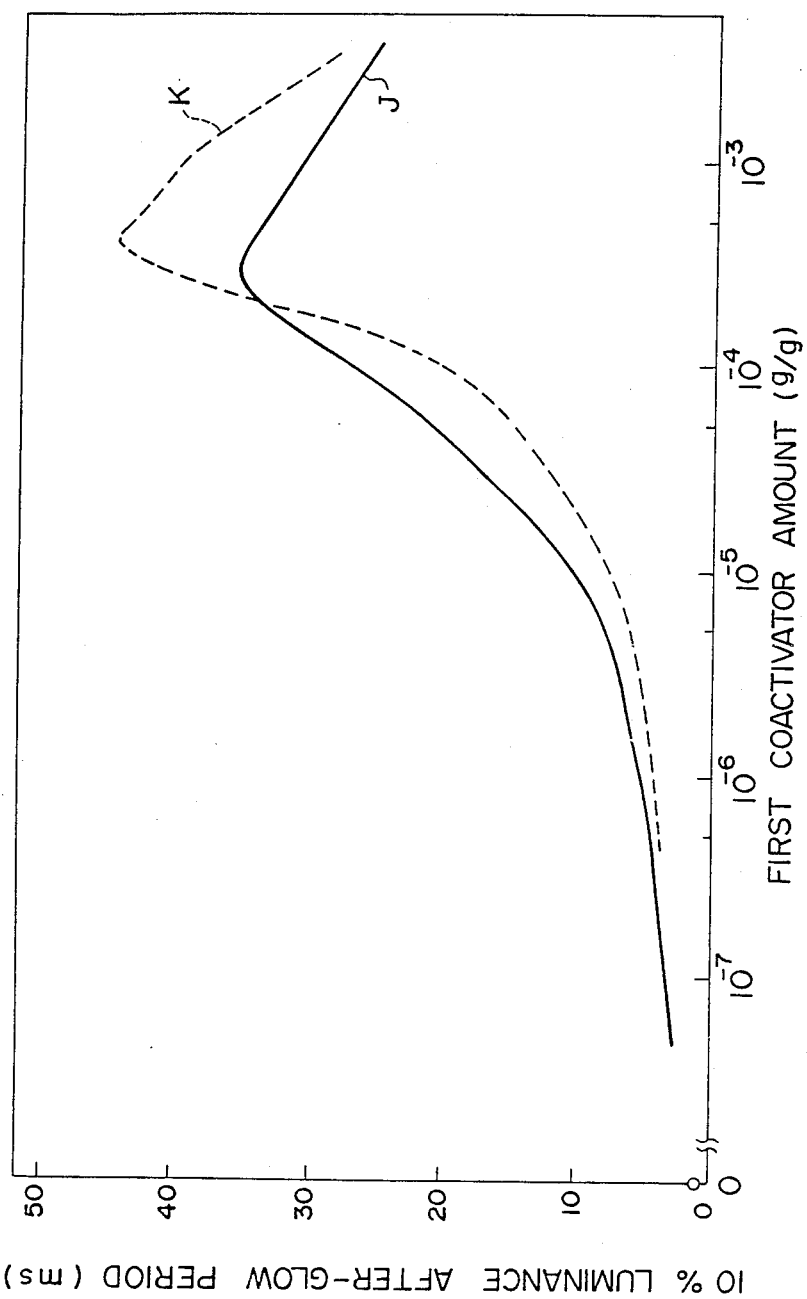
FIGS. 4 and 5 are graphs showing the relationships between the amount of the first coactivator contained in the phosphors in accordance with the present invention and the 10% luminance after-glow period of the phosphors.
Figure 5:
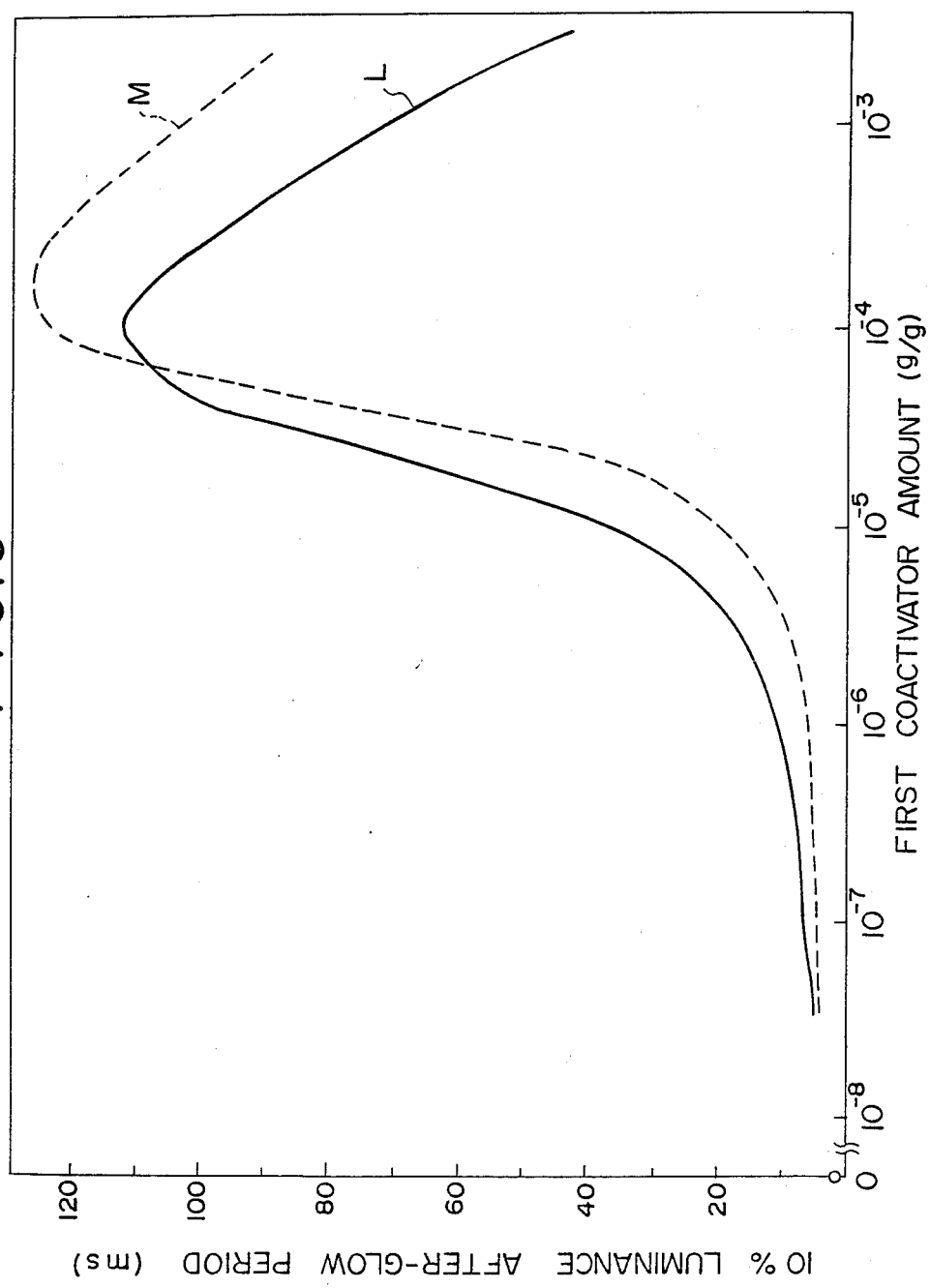

FIGS. 4 and 5 shows the relationships between the amount of the first coactivator contained in the phosphors in accordance with the present invention and the 10% luminance after-glow period of the phosphors.

In FIG. 4, the curves J and K respectively shows the relationships between the amount of gallium or indium contained as the first coactivator and the 10% luminance after-glow period in a ZnS:Au,Ga,Al phosphor and a ZnS:Au,In,Al phosphor which manifest the cubic crystal system as the main crystalline phase and in which the amounts of gold and aluminium respectively are $1.4\times10^{-3}$ g/g and $6\times10^{-4}$ g/g based on the zinc sulfide matrix.

In FIG. 4, the mark "o" on the ordinate of the graph showing the after-glow period indicates the after-glow period (approximately 250 microseconds) of the conventional ZnS:Au,Al phosphor which manifests the cubic crystal system as the main crystalline phase and in which the amounts of gold and aluminium are the same as in the phosphors of the curves J and K.

As shown in FIG. 4, the after-glow period of the phosphors in accordance with the present invention in which the amount of the first coactivator is within the range of $5\times10^{-8}$ to $5\times10^{-3}$ g/g based on the zinc sulfide matrix is several tens of times to several hundreds of times longer than the after-glow period of the conventional ZnS:Au,X phosphor. Particularly, the phosphors in accordance with the present invention in which the amount of the first coactivator is within the range of $5\times10^{-6}$ to $5\times10^{-3}$ g/g exhibits a markedly long after-glow period. As described above, however, the luminance of emission and the purity of emission color of the phosphors in accordance with the present invention are decreased as the amount of the first coactivator is greatly increased. In view of the luminance of emission and the purity of emission color, the amount of the first coactivator contained in the phosphors according to the first aspect of the present invention should preferably be within the range of $5\times10^{-7}$ to $2\times10^{-4}$ g/g.

In FIG. 5, the curves L and M respectively show the relationships between the amount of gallium or indium contained as the first coactivator and the 10% luminance after-glow period in a ZnS:Cu,Ga,Al phosphor and a ZnS:Cu,In,Al phosphor which manifest the cubic crystal system as the main crystalline phase and in which the amounts of copper and aluminium respectively are $1.2\times10^{-4}$ g/g and $3\times10^{-4}$ g/g based on the zinc sulfide matrix.

In FIG. 5, the mark "o" on the ordinate of the graph showing the after-glow period indicates the after-glow period (approximately 200 microseconds) of the conventional ZnS:Cu,Al phosphor which manifests the cubic crystal system as the main crystalline phase and in which the amounts of copper and aluminium are the same as in the phosphors of the curves L and M.

As shown in FIG. 5, the after-glow period of the phosphors in accordance with the present invention in which the amount of the first coactivator is within the range of $5\times10^{-8}$ to $2\times10^{-3}$ g/g based on the zinc sulfide matrix is several tens of times to several hundreds of times longer than the after-glow period of the conventional ZnS:Cu,X phosphor. Particularly, the phosphors in accordance with the present invention in which the amount of the first coactivator is within the range of $5\times10^{-6}$ to $2\times10^{-3}$ g/g exhibits a markedly long after-glow period. As described above, however, the luminance of emission and the purity of emission color of the phosphors in accordance with the present invention are decreased as the amount of the first coactivator is greatly increased. In view of the luminance of emission and the purity of emission color, the amount of the first coactivator contained in the phosphors according to the first aspect of the present invention should preferably be within the range of $5\times10^{-8}$ to $2\times10^{-4}$ g/g.

As mentioned above, of the phosphors in accordance with the present invention, the phosphor comprising the cubic crystal system as the main crystalline phase exhibits a luminance of emission approximately 1.3 to 2 times higher than the luminance of emission of the phosphor comprising the hexagonal crystal system as the main crystalline phase. Further, when the amount of the first coactivator is within the aforesaid preferable range ($5\times10^{-8}$ to $2\times10^{-4}$ g/g), the phosphor comprising the cubic crystal system as the main crystalline phase exhibits an after-glow period longer than the after-glow period of the phosphor comprising the hexagonal crystal system as the main crystalline phase. In view of the above, the phosphor comprising the cubic crystal system as the main crystalline phase is more preferable as the phosphor for high resolution CRTs than the phosphor comprising the hexagonal crystal system as the main crystalline phase. Particularly, the phosphor which comprises the cubic crystal system as the main crystalline phase and in which the amount of the first coactivator is within the range of $5\times10^{-8}$ to $2\times10^{-4}$ g/g is most preferable for use in high resolution CRTs.

It has been found that approximately the same effects as the effects of the sulfide phosphors described above can be obtained also with the zinc cadmium sulfide phosphors in accordance with the present invention.

As described above, the present invention particularly provides green to orange emitting phosphors for high resolution CRTs, and is very valuable from the industrial viewpoint. In the phosphors of the present invention, a part of the first coactivator may be placed with scandium. Further, the phosphors of the present invention may further be activated with another activator such as bivalent europium, bismuth, or antimony. Further, in the phosphors of the present invention, a part of sulfur may be replaced with selenium in order to shift the emission wavelength to the longer wavelength side.

Further, in order to improve the contrast of the phosphors in accordance with the present invention, it is possible to attach or add pigments to the phosphors. As the pigments, a pigment of approximately the same color as the emission color of the phosphors, or a black pigment (iron oxide, tungsten, or the like) may be used. The pigments may be used in an amount within the range of 0.5 to 40 parts by weight per 100 parts by weight of the phosphors in accordance with the present invention.

The sulfide phosphors in accordance with the present invention can be subjected to any treatment which is employed for the known sulfide phosphors, such as surface treatment or grain size selection.

On the other hand, the electron excited fluorescent display device in accordance with the present invention is of the type excited with an electron beam to conduct displaying, and comprises the aforesaid phosphors emitting green to orange light with long after-glow in accordance with the present invention as the major portion of the green to orange emitting component of the fluorescent screen.

The electron excited fluorescent display devices of this type include fine display CRTs such as black-and-white CRT and monochrome CRT, fluorescent display devices excited with a low-velocity electron beam, and the like. The electron excited fluorescent display devices in accordance with the present invention will hereinbelow be described in further detail by taking high resolution CRTs as an example.

First, a monochrome emission CRT using a green to yellow-green emitting phosphor will be described below as the first embodiment.

To accomplish the above-mentioned objects of the present invention, the inventors conducted various investigations on a green emitting CRT provided with a fluorescent screen containing no pollutant. As a result, it was found that the above-described problems of the conventional devices can be solved by a CRT provided with a fluorescent screen comprising a zinc sulfide phosphor activated with a specific amount of a novel combination of activators, and an electron gun having a specific beam diameter and a specific frame frequency, and the CRT according to the first embodiment was completed.

The CRT exhibiting a single emission color according to the first embodiment comprises an electron gun emitting cathode rays having a beam diameter at a fluorescent screen within the range of 0.05 mm to 0.4 mm and a frame frequency within the range of 20 Hz to 50 Hz, and a fluorescent screen comprising, as a main constituent thereof, a phosphor emitting green to yellow-green light with long after-glow and represented by the above-described formula of the phosphors in accordance with the present invention wherein the values x, e, f and g respectively satisfy the conditions of $x=0$, $10^{-6} \leq e \leq 10^{-2}$, $5 \times 10^{-8} \leq f \leq 5 \times 10^{-3}$, and $5 \times 10^{-8} \leq g \leq 5 \times 10^{-4}$, said fluorescent screen being formed on a face plate standing face to face with said electron gun.

The term "single emission color" as used herein means green emission color, and does not means a single emission spectrum. As the phosphor to be used in the fluorescent screen of the CRT in accordance with the first embodiment, it is also possible to use a mixture containing a long after-glow or short after-glow green emitting phosphor exhibiting another green emission spectrum other than the the aforesaid green emitting phosphor.

The CRT of this embodiment contains no pollutant such as arsenic in the fluorescent screen, and exhibits emission of high luminance. The CRT can exhibit long after-glow emission of any color within the range of green to yellow-green light by the selection of the kind and amount of the activator contained in the phosphor. Further, an after-glow period within the range of several milliseconds to several hundreds of milliseconds can be selectively obtained by the adjustment of the amounts of the first coactivator and the second coactivator contained in the phosphor. Since the coating characteristics of the phosphor used in this embodiment are good unlike the aforesaid conventional long after-glow phosphor, it is possible to obtain a fluorescent screen of good quality. Further, by the combination of the fluorescent screen with the aforesaid electron gun, a CRT exhibiting excellent image quality (resolution, gradation, or the like) and excellent luminance of emission suitable for display purposes is obtained.

From the viewpoint of luminance as described above, the phosphor manifesting the cubic crystal system as the main crystalline phase thereof is more preferable as the phosphor used in this embodiment than the phosphor manifesting the hexagonal crystal system as the main crystalline phase thereof.

The first embodiment will hereinbelow be described in further detail.

Figure 6:
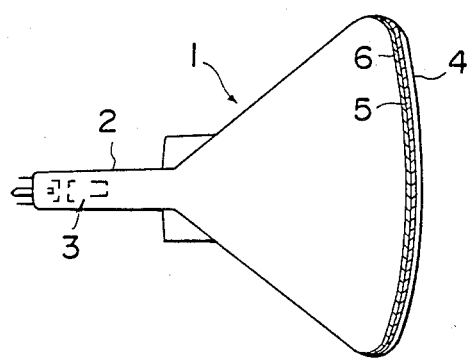
FIG. 6 is a sectional view showing an embodiment of the display CRT in accordance with the present invention.

As shown in FIG. 6, the CRT of this embodiment is constructed in almost the same manner as the conventional monochrome emission CRT such as black-and-white television CRT, excepting the constituents of the electron gun and the fluorescent screen. Namely, in the CRT of this embodiment, an electron gun 3 is positioned at a neck portion 2 of a funnel 1, and a fluorescent screen 5 is formed on the entire surface of a face plate 4 standing face to face with the electron gun 3. In general, a deposited aluminium film 6 for preventing the charge-up phenomenon occurring at the time of excitation is positioned on the rear side of the fluorescent screen 5. The fluorescent screen 5 comprises a specific phosphor emitting green to yellow-green light with long after-glow, and the electron gun 3 has a specific beam diameter and a specific frame frequency.

From the viewpoint of luminance or the like, the values e, f, and g indicting the amounts of the activator and the coactivators in the phosphor used in this embodiment should more preferably satisfy the conditions of $10^{-5} \leq e \leq 5 \times 10^{-4}$, $5 \times 10^{-7} \leq f \leq 5 \times 10^{-4}$, and $5 \times 10^{-7} \leq g \leq 2 \times 10^{-4}$, respectively. (The phosphors used in this embodiment also embrace those containing sulfur in an amount within the range of $10^{-7}$ to $8 \times 10^{-3}$ g/g based on the aforesaid matrix in the aforesaid phosphor compositions.)

The emission color of the phosphor used in this embodiment changes within the range of green to yellow-green according to the kind and amount of the activator contained in the phosphor. In general, the phosphor containing copper (Cu) as the activator exhibits green emission. In the phosphor containing copper and gold (Au) as the activator, the emission color changes from green to yellow-green as the amount of Au is increased. The after-glow characteristics (after-glow period and the like) depend mainly on the kind and amount of the first coactivator, and the kind and amount of the second coactivator.

The electron gun employed in this embodiment emits cathode rays having a beam diameter at the fluorescent screen within the range of 0.05 mm to 0.4 mm, and a frame frequency within the range of 20 Hz to 50 Hz.

An example of the emission spectrum of the CRT of this embodiment is shown by the curve E in FIG. 2, and the after-glow characteristics thereof are shown by the curve I in FIG. 3. The curves E and I were obtained by using a green emitting CRT comprising a copper, gallium and aluminium activated zinc sulfide phosphor manifesting the cubic crystal system.

As shown in FIG. 2, the CRT of this embodiment exhibits good green emission like the emission of the green emitting component in the conventional color CRT. Further, as shown by the curve I in FIG. 3, the CRT of this embodiment exhibits an after-glow period of approximately 40 milliseconds, the value which is sufficient for display purposes and greatly longer than the after-glow period (approximately 200 microseconds) of a CRT provided with a fluorescent screen comprising the conventional ZnS:Cu,Al phosphor as indicated by the curve H.

FIG. 5 shows the relationship between the amount of the first coactivator contained in the phosphor employed in this embodiment and the after-glow period of the CRT. In FIG. 5, the curve L is for the case wherein gallium (Ga) is selected as the first coactivator, and the curve M is for the case wherein indium is selected as the first coactivator.

Figure 7:
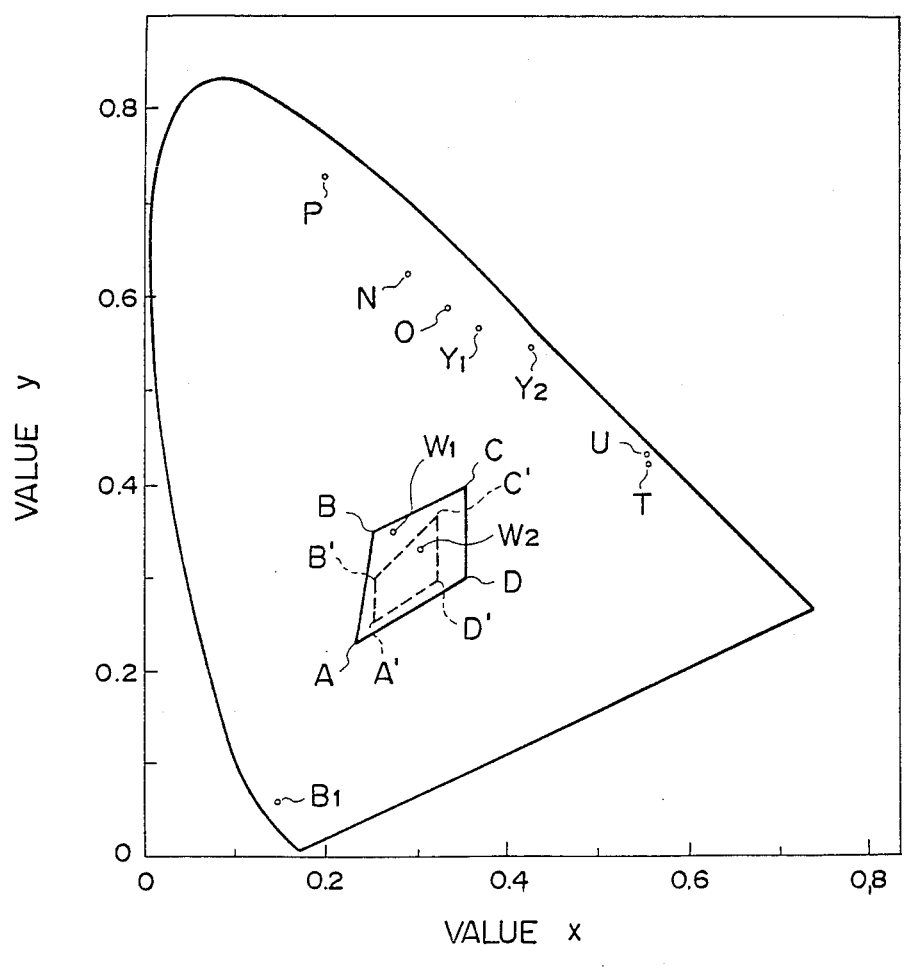
FIG. 7 is a graph showing the CIE system chromaticity points of emission colors of the phosphors employed in the present invention and the display CRT in accordance with the present invention.

The emission color (green) of the CRT of this embodiment is indicated by the point N in FIG. 7.

In this first embodiment, when a part of the cativator Cu is increasingly replaced with Au (within the range of 0 to $5 \times 10^{-4}$ g/g), the emission color changes up to the point O (yellow-green). Compared with the emission color of a CRT comprising the conventional P39 phosphor, which is indicated by the point P in FIG. 7, the emission color of the CRT of this embodiment is nearer to yellow-green to which the eye of human exhibits the highest visual sensitivity. Accordingly, the CRT of this embodiment provides a display screen lighter than the conventional CRTs. Further, unlike the conventional CRT using the P39 phosphor in which the emission color cannot be changed, this embodiment makes it possible to provide a CRT exhibiting any desired emission color within the range of the point N to the point O.

Since the phosphors used in this embodiment are based pm the zinc sulfide type matrix, it is possible to easily obtain a grain size within the range of several microns to several tens of microns according to the preparation method. Further, unlike the conventional P39 phosphor which is composed of flat grains and is difficult to form a fluorescent screen of good quality, the phosphors used in this embodiment are approximately spherical and therefore they can form a fluorescent screen of high quality.

As described above, the CRT of this embodiment exhibits an emission color matching the visual sensitivity of human and a fluorescent screen of high quality. Accordingly, the CRT can provide a higher luminance of emission than the luminance of emission of the conventional CRTs.

Also for the aforesaid phosphors employed in this embodiment, the emission color and the after-glow characteristics may be adjusted by the addition of small amounts of known phosphors emitting green to yellow-green light. Also, as described above, a part of the first coactivator in the phosphors employed in this embodiment may be replaced with scandium. Further, the phosphors may further be activated with another activator such as bivalent europium, bismuth, or antimony. Further, in these phosphors, a part of sulfur may be replaced with selenium in order to shift the emission wavelength to the longer wavelength side.

Further, in order to improve the contrast of the phosphors employed in this embodiment, it is possible to attach or add pigments to the phosphors. As the pigments, a pigment of approximately the same green color as the emission color of the phosphors ($TiO_2$-ZnO-CoO-NiO type oxide green pigment or the like), or a black pigment (iron oxide, tungsten, or the like) may be used. The pigments may be used in an amount within the range of 0.5 to 40 parts by weight per 100 parts by weight of the phosphors employed in this embodiment.

Also in this embodiment, the sulfide phosphors can be subjected to any treatment which is employed for the known sulfide phosphors, such as surface treatment or grain size selection.

As described above, the CRT of this first embodiment contains no pollutant, and exhibits green emission of high luminance by the fluorescent screen of high quality. Accordingly, the CRT is markedly valuable from the industrial viewpoint.

Secondly, a monochrome emission CRT using an orange emitting phosphor will be described below as the second embodiment.

The CRT of the second embodiment comprises an electron gun emitting cathode rays having a beam diameter at a fluorescent screen within the range of 0.05 mm to 0.4 mm and a frame frequency within the range of 20 Hz to 50 Hz, and a fluorescent screen comprising, as a main constituent thereof, a phosphor emitting orange light with long after-glow and represented by the above-described formula of the phosphors in accordance with the present invention wherein the values x, e, f and g respectively satisfy the conditions of $0.15 \leq x \leq 0.35$, $10^{-6} \leq e \leq 10^{-2}$, $5 \times 10^{-8} \leq f \leq 5 \times 10^{-3}$, and $5 \times 10^{-8} \leq g \leq 5 \times 10^{-3}$, said fluorescent screen being formed on a face plate standing face to face with said electron gun.

In the CRT of this embodiment, the fluorescent screen may be composed only of the aforesaid phosphor emitting orange light with long after-glow, or may be composed of a mixture containing the aforesaid phosphor and small amounts of the other phosphors for adjusting the emission color or the after-glow period.

The sulfide phosphor used in the CRT of this embodiment can exhibit emission of any color within the range between orange near to red and orange near to yellow by the selection of the amount of Cd in the matrix, and the kind and amount of the activator contained in the phosphor. Further, the phosphor exhibits good coating chracteristics and emission of high luminance. Accordingly, by the combination of the fluorescent screen with the aforesaid electron gun, a CRT exhibiting excellent emission color and excellent image quality (resolution, uniformity, or the like) suitable for display purposes is obtained.

The second embodiment will hereinbelow be described in further detail.

The CRT of this embodiment is constructed in almost the same manner as the CRT shown in FIG. 6, except that the phosphor constituting the fluorescent screen is replaced with the aforesaid phosphor emitting orange light with long after-glow.

From the viewpoint of image quality and luminance of emission, the values e, f, and g indicating the amounts of the activator and the coactivators in the phosphor used in this embodiment should more preferably satisfy the conditions of $10^{-5} \leq e \leq 6 \times 10^{-3}$, $5 \times 10^{-7} \leq f \leq 5 \times 10^{-4}$, and $5 \times 10^{-7} \leq g \leq 10^{-3}$, respectively. (The phosphors used in this embodiment also embrace those containing sulfur in an amount within the range of $10^{-7}$ to $8 \times 10^{-3}$ g/g based on the aforesaid matrix of the phosphors.)

The curve Q in FIG. 1 and the curve R in FIG. 2 indicates the emission spectra of the phosphors employed in the CRT of the second embodiment. The curve Q in FIG. 1 shows the emission spectrum of a phosphor containing gold as the activator, i.e. a hexagonal crystal system phosphor emitting orange light and represented by the formula of $(Zn_{0.82},Cd_{0.18})S:Au,Ga,Al$ (wherein the amount of Au is $1.4 \times 10^{-3}$ g/g, the amount of Ga is $5 \times 10^{-5}$ g/g, and the amount of Al is $6 \times 10^{-4}$ g/g). The curve R in FIG. 2 shows the emission spectrum of a phosphor containing copper as the activator, i.e. a hexagonal crystal system phosphor emitting orange light and represented by the formula of $(Zn_{0.78},Cd_{0.22})S:Cu,Ga,Al$ (wherein the amount of Cu is $1.2 \times 10^{-4}$ g/g, the amount of Ga is $1.5 \times 10^{-5}$ g/g, and the amount of Al is $3 \times 10^{-4}$ g/g).

As shown by the curve Q in FIG. 1 and the curve R in FIG. 2, the phosphors employed in the second embodiment exhibit good orange emission.

The curve S in FIG. 3 shows the after-glow characteristics of the phoshor employed in the CRT of the second embodiment. The curve S indicates the after-glow characteristics after the stop of electron excitation of the orange emitting phosphor represented by the formula of $(Zn_{0.82},Cd_{0.18})S:Au,Ga,Al$ (wherein the amount of Au is $1.4 \times 10^{-3}$ g/g, the amount of Ga is $5 \times 10^{-5}$ g/g, and the amount of Al is $6 \times 10^{-4}$ g/g).

As is clear from the curve S in FIG. 3, the phosphor employed in the second embodiment exhibits an after-glow period of approximately 30 milliseconds, which is sufficiently long for display purposes.

In FIG. 7 showing the CIE system chromaticity points of the emission colors of the CRTs in accordance with the present invention, the point T indicates the chromaticity point of the phosphor which comprises $(Zn_{0.82},Cd_{0.18})S$ as the matrix and in which the amounts of Au as the activator, Ga and Al as the coactivators are $1.4 \times 10^{-3}$ g/g, $5 \times 10^{-5}$ g/g, and $6 \times 10^{-4}$ g/g, respectively, based on the matrix. The point U indicates the chromaticity point of the phosphor which comprises $(Zn_{0.78},Cd_{0.22})S$ as the matrix and in which the amounts of Cu as the activator, Ga and Al as the coactivators are $1.2 \times 10^{-4}$ g/g, $1.5 \times 10^{-5}$ g/g, and $3 \times 10^{-4}$ g/g, respectively, based on the matrix. As shown by the points T and U in FIG. 7, the orange emitting phosphors employed in the second embodiment exhibit orange emission of high quality. Since these long after-glow orange emitting phosphors employed in this embodiment are of the single phosphor type and are not composed of a phosphor mixture, they are free of any color shading, unlike a long after-glow orange emitting phosphor comprising a mixture of the P27 phosphor and the P39 phosphor.

Since the phosphors employed in this embodiment are based on the zinc sulfide type matrix, it is possible to easily obtain a grain size within the range of several microns to several tens of microns according to the preparation method. Further, unlike the conventional long after-glow orange emitting phosphor which is difficult to form a fluorescent screen of high quality due to the grain shape and grain distribution unsuitable for coating, the phosphors employed in this embodiment are approximately spherical and therefore they can form a fluorescent screen of high quality.

As described above, the CRT of the second embodiment exhibits orange emission of high quality. Further, since the phosphor employed exhibits emission of high luminance and can form a fluorescent screen of high quality, the CRT of this embodiment provides emission of a higher luminance than the conventional CRTs.

Also for the aforesaid phosphors employed in the second embodiment, the emission color and the after-glow characteristics may be adjusted by the addition of small amounts of known phosphors. Also, as described above, a part of the first coactivator in the phosphors employed in this embodiment may be replaced with scandium. Further, the phosphors may further be activated with another activator such as divalent europium, bismuth, or antimony. Further, in these phosphors, a part of sulfur may be replaced with selenium in order to shift the emission wavelength to the longer wavelength side.

Further, in order to improve the contrast of the phosphors employed in the second embodiment, it is possible to attach or add pigments to the phosphors. As the pigments, a pigment of approximately the same orange color as the emission color of the phosphors (red lead, molybdenum orange, cadmium sulfoselenide pigment, or the like), or a back pigment (iron oxide, tungsten, or the like) may be used. The pigments may be used in an amount within the range of 0.5 to 40 parts by weight per 100 parts by weight of the phosphors employed in this embodiment.

As described above, the CRT of the second embodiment exhibits orange emission of high luminance by virtue of the fluorescent screen of high quality, and is markedly valuable from the industrial viewpoint.

Thirdly, a white emitting phosphor and a CRT using the phosphor will be described below as the third embodiment.

The white emitting phosphor employed in the third embodiment comprises a mixture of a long after-glow blue emitting phosphor and a long after-glow yellow emitting phosphor. The long after-glow blue emitting phosphor employed in the third embodiment can be prepared by the method described, for example, in Japanese patent application Nos. 56(1981)-176170, 56(1981)-180721, 56(1981)-181624, 56(1981)-212278, 57(1982)-1131, and 57(1982)-12866. As the long after-glow yellow emitting phosphor employed in this embodiment, the above-described phosphors in accordance with the present invention are used.

The long after-glow blue emitting phosphor obtained by the method described above is represented by the formula of $ZnS:aAg,bM^I,cM^{III},dX$ (the phosphors used in this embodiment also embrace those containing sulfur in an amount within the range of $10^{-7}$ to $8 \times 10^{-3}$ g/g based on the aforesaid matrix in the aforesaid phosphor compositions). The emission color of the blue emitting phosphor change mainly according to the amount of Ag (value a), the kind of $M^I$, and the amount of $M^I$ (value b). The after-glow characteristics (after-glow period and the like) of the blue emitting phosphor depend mainly on the kind of $M^{III}$, the amount of $M^{III}$ (value c), the kind of X, and the amount of X (value d). In order to obtain emission of blue region, the values a and b are selected to satisfy the conditions of $5\times10^{-6}\leq a\leq10^{-3}$ and $0\leq b\leq2\times10^{-4}$. From the viewpoint of color purity and luminance of emission, these values should preferably be selected to satisfy the conditions of $5\times10^{-6}\leq a\leq5\times10^{-4}$ and $0\leq b\leq10^{-5}$. From the viewpoint of after-glow characteristics, the values c and d are selected to satisfy the conditions of $10^{-8}\leq c\leq10^{-3}$ and $5\times10^{-8}\leq d\leq5\times10^{-4}$. From the viewpoint of after-glow period and luminance of emission, these values should preferably be selected to satisfy the conditions of $10^{-7}\leq c\leq10^{-4}$ and $10^{-7}\leq d\leq10^{-4}$.

On the other hand, the long after-glow yellow emitting phosphor obtained as described above is represented by the formula of $(Zn_{1-x}, Cd_x(S:eM^r, fM^{III}, gX'$ (the phosphors used in this embodiment also embrace those containing sulfur in an amount within the range of $10^{-7}$ to $8\times10^{-3}$ g/g based on the aforesaid matrix in the aforesaid phosphor compositions). The emission color of the yellow emitting phosphor changes mainly according to the kind of $M^r$, the amount of $M^r$ (value e), and the amount of replacement of Zn with Cd in the matrix (value x). The after-glow characteristics (after-glow period and the like) of the yellow emitting phosphor depend mainly on the kind of $M^{III}$, the amount of $M^{III}$ (value f), the kind of X', and the amount of X' (value g). To obtain emission in the yellow region, the values e and x are selected to satisfy the conditions of $10^{-6}\leq e\leq10^{-2}$ and $0\leq x\leq0.3$. From the viewpoint of color purity and luminance of emission, these values should preferably be selected to satisfy the conditions of $10^{-5}\leq e\leq5\times10^{-3}$ and $0\leq x\leq0.2$. For reason of the after-glow characteristics, the values f and g are selected to satisfy the conditions of $5\times10^{-8}\leq f\leq5\times10^{-3}$ and $5\times10^{-8}\leq g\leq10^{-3}$. From the viewpoint of after-glow period and luminance of emission, these values should preferably be selected to satisfy the conditions of $10^{-7}\leq f\leq10^{-4}$ and $5\times10^{-8}\leq g\leq5\times10^{-4}$.

The white emitting phosphor employed in the third embodiment is obtained by mixing the aforesaid long after-glow yellow emitting phosphor and the aforesaid long after-glow blue emitting phosphor in a weight ratio of the former to the latter within the range between 0.34 and 5.00 so as to obtain emission within the white emission region surrounded by the CIE system chromaticity points A (x=0.23, y=0.23), B(x=0.25, y=0.35), C(x=0.35, y=0.40), and D(x=0.35, Y=0.30). The aforesaid mixing weight ratio should preferably be within the range between 0.5 and 4.0 so as to obtain emission of higher white purity within the region surrounded by the CIE system chromaticity points A'(x=0.25, y=0.25), B'(x=0.25, y=0.30), C'(x=0.32, y=0.37), and D'(x=0.32, y=0.30).

The CRT of the third embodiment is constructed in the same manner as the other CRTs as shown in FIG. 6, excepting the fluorescent screen. The fluorescent screen may be formed by any known method such as sedimentation coating method generally employed for the formation of the fluorescent screens of black-and-white television CRTs. From the viewpoint of luminance of emission, beam diameter, current density, acceleration potential, or the like, of the CRT, the amount of the phosphor contained in the fluorescent screen should preferably be within the range of 1.0 mg/cm$^2$ to 10 mg/cm$^2$, more preferably within the range of 2.5 mg/cm$^2$ to 7 mg/cm$^2$. From the viewpoint of luminance of emission and image display, the after-glow period of the phosphor should preferably be selected from the range of 5 to 150 milliseconds.

In the embodiment of the present invention, the beam diameter of the cathode rays emitted from the electron gun 3 should preferably be within the range of 0.05 to 0.4 mm when the cathode rays impinge upon the fluorescent screen 5. The frame frequency used should preferably be within the range of 20 Hz to 50 Hz.

FIG. 7 shows the emission chromaticity points of the white emitting phosphor, and the component phosphors of the white emitting phosphor, i.e. the long after-glow blue emitting phosphor and the long after-glow yellow emitting phosphor under electron excitation on the CIE system chromaticity coordinates.

In FIG. 7, the chromaticity points $B_1$(x=0.147, y=0.056), $Y_1$(x=0.369, y=0.568), and $Y_2$(x=0.427, y=0.548) respectively indicate the emission colors of a long after-glow blue emitting phosphor ZnS:$10^{-4}$Ag:$1.5\times10^{-5}$Ga:$10^{-5}$Cl, a long after-glow yellow emitting phosphor ZnS:$1.4\times10^{-3}$Au:$10^{-4}$Ga:$6\times10^{-4}$Al, and a long after-glow yellow emitting phosphor Zn$_{0.89}$Cd$_{0.11}$S:$1.2\times10^{-4}$Cu:$1.5\times10^{-5}$Ga:$3\times10^{-4}$Al. The chromaticity points $W_1$ and $W_2$ respectively indicate the emission colors of a white emitting phosphor in accordance with the present invention which is obtained by mixing a long after-glow blue emitting phosphor ZnS:$10^{-4}$Ag:$1.5\times10^{-5}$Ga:$10^{-6}$Cl and a long after-glow yellow emitting phosphor ZnS:$1.4\times10^{-3}$Au:$10^{-4}$Ga:$6\times10^{-4}$Al in a weight ratio 3:7, and a white emitting phosphor in accordance with the present invention which is obtained by mixing a long after-glow blue emitting phosphor ZnS:$10^{-4}$Ag:$1.5\times10^{-5}$Ga:$10^{-6}$Cl and a long after-glow yellow emitting phosphor Zn$_{0.89}$Cd$_{0.11}$S:$1.2\times10^{-4}$Cu:$1.5\times10^{-5}$Ga:$3\times10^{-4}$Al in a weight ratio of 3:7.

FIG. 8 shows the emission spectrum and the after-glow spectra of the white emitting phosphor in accordance with the present invention, the emission color of which is represented by the chromaticity point $W_2$. In FIG. 8, the curve V indicates the emission spectrum under excitation with cathode rays, the curve W indicates the emission spectrum obtained 10 milliseconds after the stop of the excitation with cathode rays, and the curve X shows the emission spectrum obtained 20 milliseconds after the stop of the excitation with cathode rays. As is clear from FIGS. 7 and 8, the white emitting phosphor in accordance with the present invention and the CRT comprising the phosphor in the fluorescent screen exhibit white emission of high color purity and are essentially free of color drift in the afterglow. Accordingly, the present invention provides a high quality CRT exhibiting very fine display.

Also in the white emitting phosphors and the CRT of the third embodiment, it is possible to attach or add pigments to the phosphors in order to improve the contrast. As the pigments, a pigment of approximately the same color as the emission color of the phosphors, or a black pigment may be used. In this embodiment, the pigment used for the above-mentioned purpose should preferably a black pigment such as iron oxide or tungsten, and the pigment should preferably be used in an amount within the range of 0.5 to 40 parts by weight per 100 parts by weight of the phosphors.

In the phosphors employed in the third embodiment, a part of the first coactivator (gallium and/or indium) may be replaced with scandium. Further, the phosphors employed in this embodiment may further be activated with another activator such as bivalent europium, bismuth, or antimony.

The white emitting phosphors employed in the third embodiment can be subjected to any treatment which is employed for the known sulfide phosphors and white emitting phosphors, such as surface treatment or grain size selection. Further, the white emitting phosphors in accordance with the present invention can be used to form fluorescent screens not only of the above-mentioned CRT but also of the other display devices, for example, low-velocity electron excited fluorescent display devices, and the like.

The present invention is further illustrated by the following nonlimitative examples.

EXAMPLE 1

| Crude Zinc sulfide powder | ZnS | 1000 g |
| Copper sulfate | $CuSO_4.5H_2O$ | 0.472 g |
| Gallium nitrate | $Ga(NO_3)_3.8H_2O$ | 0.086 g |
| Aluminium sulfate | $Al_2(SO_4)_3.18H_2O$ | 3.70 g |

The above phosphor raw materials were intimately mixed in a ball mill, and then appropriate amounts of sulfur and carbon were added. The mixture thus obtained was charged into a quartz crucible, and a cover was put on the quartz crucible. The crucible was put into an electric furnace, in which the raw material mixture was fired for three hours at a temperature of 950° C. During this firing, a carbon disulfide atmosphere developed in the crucible. After the firing, the firing product obtained was taken out of the crucible, washed with water, dried and sifted. In this way, a ZnS:Cu,Ga,Al phosphor according to the first aspect of the present invention in which the amounts of copper, gallium and aluminium were $1.2\times10^{-4}$ g/g, $1.5\times10^{-5}$ g/g, and $3\times10^{-4}$ g/g, respectively, based on the zinc sulfide matrix was obtained.

The phosphor thus obtained exhibited green emission with the emission spectrum indicated by the curve E in FIG. 2 under electron excitation. The after-glow period after the stop of electron excitation of this phosphor was approximately 55 milliseconds.

EXAMPLE 2

A ZnS:Cu,In,Al phosphor in which the amounts of copper, indicum and aluminium were $1.2\times10^{-4}$ g/g, $2\times10^{-5}$ g/g, and $3\times10^{-4}$ g/g, respectively, based on the zinc sulfide matrix was prepared in the same manner as described in Example 1, except that 0.062 g of indium nitrate $\{In(NO_3)_3.3H_2O\}$ was used instead of gallium nitrate.

The phosphor thus obtained exhibited green emission under electron excitation, and the after-glow period of this phosphor was approximately 35 milliseconds.

EXAMPLE 3

| ZnS | 1000 g |
| $HAuCl_4.4H_2O$ | 2.93 g |
| $Ga(NO_3)_3.8H_2O$ | 0.344 g |
| $Al_2(SO_4)_3.18H_2O$ | 7.40 g |

By using the above phosphor raw materials, a ZnS:Au,Ga,Al phosphor in which the amounts of gold, gallium and aluminium were $1.4\times10^{-3}$ g/g, $6\times10^{-5}$ g/g, and $6\times10^{-4}$ g/g, respectively, based on the zinc sulfide matrix was prepared in the same manner as described in Example 1.

The phosphor thus obtained exhibited yellow-green emission with the emission spectrum indicated by the curve A in FIG. 1 under electron excitation. The after-glow period of this phosphor was approximately 23 milliseconds.

EXAMPLE 4

A ZnS:Au,In,Al phosphor in which the amounts of gold, indium and aluminium were $1.4\times10^{-3}$ g/g, $10^{-4}$ g/g, and $6\times10^{-4}$ g/g, respectively, based on the zinc sulfide matrix was prepared in the same manner as described in Example 3, except that 0.309 g of indium nitrate $\{In(NO_3)_3.3H_2O\}$ was used instead of gallium nitrate.

The phosphor thus obtained exhibited yellow-green emission under electron excitation, and the after-glow period of this phosphor was 20 milliseconds.

EXAMPLE 5

| ZnS | 850 g |
| CdS | 150 g |
| $CuSO_4.5H_2O$ | 0.472 g |
| $Ga(NO_3)_3.8H_2O$ | 0.086 g |
| $Al_2(SO_4)_3.18H_2O$ | 3.70 g |

By using the above phosphor raw materials, a $(Zn_{0.88}.Cd_{0.11})S:Cu,Ga,Al$ phosphor in which the amounts of copper, gallium and aluminium were $1.2\times10^{-4}$ g/g, $1.5\times10^{-5}$ g/g, and $3\times10^{-4}$ g/g, respectively, based on the zinc cadmium sulfide matrix was prepared in the same manner as described in Example 1.

The phosphor thus obtained exhibited yellow emission with the emission spectrum indicated by the curve F in FIG. 2 under electron excitation. The after-glow period of this phosphor was approximately 35 milliseconds.

EXAMPLE 6

| ZnS | 800 g |
| CdS | 200 g |
| $HAuCl_4.4H_2O$ | 2.93 g |
| $Ga(NO_3)_3.8H_2O$ | 0.287 g |
| $Al_2(SO_4)_3.18H_2O$ | 7.40 g |

By using the above phosphor raw materials, a $(Zn_{0.85},Cd_{0.15})S:Au,Ga,Al$ phosphor in which the amounts of gold, gallium and aluminium were $1.4\times10^{-3}$ g/g, $5\times10^{-5}$ g/g, and $6\times10^{-4}$ g/g, respectively, based on the zinc cadmium sulfide matrix was prepared in ths same manner as described in Example 1.

The phosphor thus obtained exhibited orange emission with the emission spectrum indicated by the curve D in FIG. 1 under electron excitation. The after-glow period of this phosphor was approximately 25 milliseconds.

EXAMPLE 7

| ZnS | 700 g |
| CdS | 300 g |
| $CuSO_4.5H_2O$ | 0.472 g |
| $Ga(NO_3)_3.8H_2O$ | 0.086 g |

| | |
|---|---|
| Al$_2$(SO$_4$)$_3$.18H$_2$O | 3.70 g |

By using the above phosphor raw materials, a (Zn$_{0.78}$,Cd$_{0.22}$)S:Cu,Ga,Al phosphor in which the amounts of copper, gallium and aluminium were $1.2 \times 10^{-4}$ g/g, $1.5 \times 10^{-5}$ g/g, and $3 \times 10^{-4}$ g/g, respectively, based on the zinc cadmium sulfide matrix was prepared in the same manner as described in Example 1.

The phosphor thus obtained exhibited orange emission with the emission spectrum indicated by the curve G in FIG. 2 under electron excitation. The after-glow period of this phosphor was approximately 20 milliseconds.

EXAMPLE 8

Zinc sulfide was precipitated by adding ammonium sulfide to an aqueous zinc sulfate solution while the pH value of the aqueous solution was maintained at 5 by the addition of sulfuric acid. The crude zinc sulfide powder thus prepared contained surplus in an amount of 7 wt. % of zinc sulfur beyond the stoichiometric sulfur amount. By using 1,070 g of the crude zinc sulfide powder containing the surplus sulfur beyond the stoichiometric amount (i.e. 1,000 g of zinc sulfide+70 g of sulfur), 0.472 g of copper sulfate (CuSO$_4$.5H$_2$O), 0.086 g of gallium nitrate [Ga(NO$_3$)$_3$.8H$_2$O], and 3.70 g of aluminium sulfate [Al$_2$(SO$_4$)$_3$.18H$_2$O], a ZnS:Cu,Ga,Al phosphor containing surplus sulfur beyond the stoichiometric amount in which the amounts of copper, gallium and aluminium and the sulfur content are $1.2 \times 10^{-4}$ g/g, $1.5 \times 10^{-5}$ g/g, $3 \times 10^{-4}$ g/g, and $10^{-6}$ g/g, respectively, based on the zinc sulfide matrix was prepared in the same manner as described in Example 1.

The phosphor thus obtained exhibited green emission with approximately the same emission spectrum as that indicated by the curve E in FIG. 2 under electron excitation. The after-glow period after the stop of electron excitation of this phosphor was approximately 55 milliseconds. Further, this phosphor according to the second aspect of the present invention exhibited a luminance of emission 10% higher than the luminance of emission of a ZnS:Cu,Ga,Al phosphor containing the same activator and coactivator amounts as those described above, but not containing surplus sulfur beyond the stoichiometric amount.

EXAMPLE 9

The cubic crystal system ZnS:Cu,Ga,Al phosphor obtained in Example 1, in which the amounts of copper, gallium and aluminium were $1.2 \times 10^{-4}$ g/g, $1.5 \times 10^{-5}$ g/g, and $3 \times 10^{-4}$ g/g, respectively, based on the zinc sulfide matrix (this phosphor was obtained in the form of approximately spherical grains having a grain size median of 8 microns and a sharp grain size distribution) was applied to a face plate in an amount of 4 mg/cm$^2$ by the sedimentation coating method to form a fluorescent screen.

A CRT in accordance with the present invention as shown in FIG. 6 was made by using the thus obtained fluorescent screen and an electron gun in which the beam diameter was set to 0.1 mm and the frame frequency was set to 40 Hz.

The obtained CRT exhibited the emission spectrum as shown by the curve E in FIG. 2, an after-glow period of approximately 55 milliseconds, and a display of high quality. The emission color of this CRT was indicated by the point N in FIG. 7. The CRT exhibited a luminance 8% improved over the luminance of a CRT using the conventional P39 phosphor.

EXAMPLE 10

To the surfaces of the ZnS:Cu,In,Al phosphor obtained in Example 2, in which the amounts of copper, indium and aluminium were $1.2 \times 10^{-4}$ g/g, $2 \times 10^{-5}$ g/g, and $3 \times 10^{-4}$ g/g, respectively, based on the zinc sulfide matrix, a black iron oxide pigment was attached in an amount of 5 wt. % based on the phosphor. Then, a CRT in accordance with the present invention was made in the same manner as described in Example 1. The CRT thus obtained exhibited a high luminance, high contrast and an after-glow period of approximately 35 milliseconds.

EXAMPLE 11

A CRT provided with a fluorescent screen comprising a cubic crystal system ZnS:Cu,Au,Ga,Al phosphor in which the amount of copper, gold, gallium and aluminium were $1.2 \times 10^{-4}$ g/g, $1.2 \times 10^{-4}$ g/g, $1.5 \times 10^{-5}$ g/g, and $3 \times 10^{-4}$ g/g, respectively, based on the zinc sulfide matrix, was made in the manner as described in Example 9, except that 0.25 g of HAuCl$_4$.4H$_2$O was further added to the phosphor raw materials. This CRT exhibited an after-glow period of 40 milliseconds, yellow-green emission, and a luminance 14% improved over the luminance of a CRT using the conventional P39 phosphor.

EXAMPLE 12

The ZnS:Cu,Ga,Al phosphor obtained in Example 8 and containing surplus sulfur beyond the stoichiometric amount (this phosphor was obtained in the form of approximately spherical grains having a grain size median of 9 microns and a sharp grain size distribution) was applied to a face plate in an amount of 5 mg/cm$^2$ by the sedimentation coating method to form a fluorescent screen (a fluorescent screen of high quality was obtained).

A CRT in accordance with the present invention as shown in FIG. 6 was made by using the thus obtained fluorescent screen and an electron gun in which the beam diameter was set to 0.2 mm and the frame frequency was set to 45 Hz.

The obtained CRT exhibited green emission, and the after-glow period thereof after the stop of electron excitation was approximately 55 milliseconds. Further, this CRT exhibited a luminance 10% higher than the luminance of a CRT made in the same manner, except that a ZnS:Cu,Ga,Al phosphor containing no surplus sulfur beyong the stoichiometric amount (the amounts of the activator and the coactivators were the same as described above) was used.

EXAMPLE 13

| | |
|---|---|
| ZnS | 750 g |
| CdS | 250 g |
| HAuCl$_4$.4H$_2$O | 2.93 g |
| Ga(NO$_3$)$_3$.8H$_2$O | 0.287 g |
| Al$_2$(SO$_4$)$_3$.18H$_2$O | 7.40 g |

By using the above phosphor raw materials, a (Zn$_{0.82}$,Cd$_{0.18}$)S:Au,Ga,Al phosphor in which the amounts of gold, gallium and aluminium were $1.4 \times 10^{-3}$ g/g, $5 \times 10^{-5}$ g/g, and $6 \times 10^{-4}$ g/g, respectively, based on the zinc cadmium sulfide matrix was prepared in the same manner as described in Example 1.

The phosphor thus obtained was in the form of spherical grains having a grain size median of 8 microns and a sharp grain size distribution. The phosphor was then applied to a face place in an amount of 4 mg/cm$^2$ by the sedimentation coating method to form a fluorescent screen. A smooth fluorescent screen having high quality was obtained. Thereafter, a CRT in accordance with the present invention as shown in FIG. 6 was made by using the thus obtained fluorescent screen and an electron gun in which the beam diameter was set to 0.2 mm and the frame frequency was set to 40 Hz.

The obtained CRT exhibited the emission spectrum as shown by the curve Q in FIG. 1, an after-glow period of approximately 30 milliseconds as shown by the curve S in FIG. 3, and a display of high quality. The emission color of this CRT was indicated by the point T (x=0.56, y=0.43) in FIG. 7.

The CRT exhibited a luminance approximately two times higher than the luminance of a CRT using a mixture of the P27 phosphor and the P39 phosphor.

EXAMPLE 14

The $(Zn_{0.78},Cd_{0.22})S:Cu,Ga,Al$ phosphor obtained in Example 7, in which the amounts of copper, gallium and aluminium were $1.2 \times 10^{-4}$ g/g, $1.5 \times 10^{-5}$ g/g, and $3 \times 10^{-4}$ g/g, respectively, based on the zinc cadmium sulfide matrix (this phosphor was obtained in the form of spherical grains having a grain size median of 9 microns and a sharp grain size distribution) was applied to a face plate in an amount of 5 mg/cm$^2$ by the sedimentation coating method to form a fluorescent screen. A smooth fluorescent screen having high quality was obtained. Thereafter, a CRT in accordance with the present invention as shown in FIG. 6 was made by using the thus obtained fluorescent screen and an electron gun in which the beam diameter was set to 0.3 mm and the frame frequency was set to 45 Hz.

The obtained CRT exhibited an after-glow period of approximately 20 milliseconds after the stop of electron excitation, and a display of high quality. The emission color of this CRT was indicated by the point U (x=0.56, y=0.44) in FIG. 7.

The CRT exhibited a luminance approximately two times higher than the luminance of a CRT using a mixture of the conventional P27 phosphor and the P39 phosphor.

EXAMPLE 15

A blue emitting phosphor represented by the formula of ZnS:$10^{-4}$Ag, $1.5 \times 10^{-5}$Ga, $10^{-6}$Cl and exhibiting an after-glow period of 35 milliseconds and an emission color indicated by the point B1 in FIG. 7 was uniformly mixed with a yellow emitting phosphor represented by the formula of $Zn_{0.89}$, $Cd_{0.11}$S:$1.2 \times 10^{-4}$Cu, $1.5 \times 10^{-5}$Ga, $3 \times 10^{-4}$Al and exhibiting an after-glow period of 35 milliseconds and an emission color indicated by the point Y2 in FIG. 7, in a mixing weight ratio of 3:7 to form a white emitting phosphor. The phosphor mixture thus obtained was uniformly applied to face place in an amount of 4 mg/cm$^2$ by the sedimentation coating method to form a fluorescent screen. Thereafter, a CRT of this invention was made according to an ordinary method of making a black-and-white television CRTs. The obtained CRT exhibited white emission of high quality as indicated by the point W2 (x=0.302, y=0.333) in FIG. 7, and an emission spectrum as indicated by the curve a in FIG. 8. The CRT exhibited after-glow as indicated by the curve b at the point of time 10 milliseconds after the stop of excitation, and after-glow as indicated by the curve c 20 milliseconds after the stop of excitation. By virtue of the satisfactory after-glow characteristics free of color drift, it was possible to provide a high resolution CRT.

EXAMPLE 16

A blue emitting phosphor represented by the formula of ZnS:$10^{-4}$Ag, $10^{-5}$Ga, $10^{-6}$Cl and exhibiting an after-glow period of 30 milliseconds and an emission color indicated by the point B1 in FIG. 7 was uniformly mixed with a yellow emitting phosphor represented by the formula of ZnS:$1.4 \times 10^{-3}$Au, $10^{-4}$Ga, $6 \times 10^{-4}$Al and exhibiting an after-glow period of 27 milliseconds and an emission color indicated by the point Y1 in FIG. 7, in a mixing weight ratio of 3:7 to obtain a white emitting phosphor. By using the phosphor thus obtained, a CRT was made in the same manner as described in Example 14. The obtained CRT exhibited white emission of high quaity as indicated by the point W1 (x=0.270, y=0.350), and satisfactory after-glow charactristics.

EXAMPLE 17

A blue emitting phosphor represented by the formula of ZnS:$10^{-4}$Ag, $2 \times 10^{-5}$In, $10^{-6}$Cl and exhibiting an after-glow period of 20 milliseconds was uniformly mixed with a yellow emitting phosphor represented by the formula of ZnS:$1.4 \times 10^{-3}$Au, $10^{-4}$In, $6 \times 10^{-4}$Al and exhibiting an after-glow period of 20 milliseconds, in a mixing weight ratio of 3:7 to obtain a white emitting phosphor. By using the phosphor thus obtained, a CRT was made in the same manner as described in Example 14. The obtained CRT exhibited white emission of high quality as indicated by the point (x=0.27, y=0.35), and satisfactory after-glow characteristics.

EXAMPLE 18

A CRT was made in the same manner as described in Example 15, except that a blue emitting phosphor and a yellow emitting phosphor containing sulfur in an amount of $10^{-6}$ g/g based on the phosphor matrices were used. The CRT thus obtained exhibited the same emission color and the same after-glow characteristics as those in Example 15, and a luminance of white emission improved by 6%.

We claim:

1. An electron excited fluorescent display device comprising, as a white emitting ingredient of a fluorscent screen, a sulfide phosphor emitting white light comprising a long after-glow yellow emitting phosphor and a long after-glow blue emitting phosphor, wherein the weight ratio of said long after-glow yellow emitting phosphor to said long after-glow blue emitting phosphor is within the range between 0.34 and 5.00, said long after-glow yellow emitting phosphor being represented by the formula:

$(Zn_{1-x'}Cd_{x'})S:eM^{I'}, fGa, gX'$ wherein $M^{I'}$ is at least one of copper and gold, $X'$ is aluminum, and x, e, f and g are numbers respectively satisfying the conditions of $0 \leq x \leq 0.3$, $10^{-6} \leq e \leq 10^{-2}$, $5 \times 10^{-7} \leq f \leq 5 \times 10^{-4}$ and $5 \times 10^{-7} \leq g \leq 10^{-3}$; and said long after-glow blue emitting phosphor being represented by the formula:

$$ZnS:aAg, bM^I, cGa, dX$$

wherein $M^I$ is at least one of copper and gold, X is at least one of chlorine, bromine, iodine, fluorine and aluminum, and a, b, c and d are numbers respectively satisfying the conditions of $5\times10^{-6}\leq a\leq 10^{-3}$, $0\leq b\leq 2\times 10^{-4}$, $10^{-8}\leq c\leq 10^{-3}$, and $5\times 10^{-8}\leq d\leq 5\times 10^{-4}$.

2. An electron excited fluorescent display device as defined in claim 1, wherein said fluorescent screen contains a pigment exhibiting black color in an amount within the range of 0.5 to 40 wt.% based on said sulfide phosphor.

3. An electron excited fluorescent display device as defined in claim 1, wherein said electron excited fluorescent display device is a cathode-ray tube for display provided with an electron gun emitting cathode rays a frame frequency within the range of 20 Hz to 50 Hz.

4. An electron excited fluorescent display device as defined in claim 3, wherein said electron gun emits cathode rays having a beam diameter within the range of 0.01 mm to 0.3 mm and a frame frequency within the range of 30 Hz to 45 Hz.

5. An electron excited fluorescent display device comprising a cathode ray tube for display including an electron gun emitting cathode rays having a beam diameter at a fluorescent screen within the range of 0.05 mm to 0.4 mm and a frame frequency within the range of 20 Hz to 50 Hz, and further comprising as a white emitting ingredient of said fluorescent screen, a sulfide phosphor emitting white light comprising a long after-glow yellow emitting phosphor and a long after-glow blue emitting phosphor, wherein the weight ratio of said long after-glow yellow emitting phosphor to said long after-glow blue emitting phosphor is within the range between 0.34 and 5.00, said long after-glow yellow emitting phosphor being represented by the formula:

$$(Zn_{1-x'}Cd_{x'})S:eM^{I'}, fGa, gX'$$

wherein $M^{I'}$ is at least one of copper and gold, $X'$ is aluminum, and x, e, f and g are numbers respectively satisfying the conditions of $0\leq x\leq 0.3$, $10^{-6}\leq e\leq 10^{-2}$, $5\times 10^{-7}\leq f\leq 5\times 10^{-4}$ and $5\times 10^{-7}\leq g\leq 10^{-3}$; and said long after-glow blue emitting phosphor being represented by the formula:

$$ZnS:aAg, bM^I, cGa, dX$$

wherein $M^I$ is at least one of copper and gold, X is at least one of chlorine, bromine, iodine, fluorine and aluminum, and a, b, c and d are numbers respectively satisfying the conditions of $5\times 10^{-6}\leq a\leq 10^{-3}$, $0\leq b\leq 2\times 10^{-4}$, $10^{-8}\leq c\leq 10^{-3}$, and $5\times 10^{-8}\leq d\leq 5\times 10^{-4}$, wherein said fluorescent screen further contains a pigment exhibiting black color in an amount within the range of 0.5 to 40 weight % based on said sulfide phosphor.

* * * * *